United States Patent
Chi et al.

(10) Patent No.: US 11,208,111 B2
(45) Date of Patent: Dec. 28, 2021

(54) REDUNDANT HARDWARE SYSTEM FOR AUTONOMOUS VEHICLES

(71) Applicant: Waymo LLC, Mountain View, CA (US)

(72) Inventors: Emily Chi, Los Angeles, CA (US); Ryan Joseph Andrade, Morgan Hill, CA (US); Andreas Wendel, Mountain View, CA (US); Michael James, Northville, MI (US); Christian Lauterbach, Campbell, CA (US); Etai Bruhis, Palo Alto, CA (US); Christopher Kennedy Ludwick, Los Altos, CA (US); Alexander Zbrozek, Sunnyvale, CA (US); Pieter Kapsenberg, Santa Clara, CA (US); Zhuyuan Liu, Los Altos, CA (US); Daniel Rosenband, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 451 days.

(21) Appl. No.: 16/215,713

(22) Filed: Dec. 11, 2018

(65) Prior Publication Data

US 2020/0180653 A1    Jun. 11, 2020

(51) Int. Cl.
*B60W 10/04* (2006.01)
*B60W 10/20* (2006.01)
(Continued)

(52) U.S. Cl.
CPC .......... *B60W 50/029* (2013.01); *B60W 10/04* (2013.01); *B60W 10/20* (2013.01);
(Continued)

(58) Field of Classification Search
CPC .......... B60W 50/0205; B60W 50/029; B60W 2050/0215; B60W 2050/0292
See application file for complete search history.

(56) References Cited

U.S. PATENT DOCUMENTS

| | | | |
|---|---|---|---|
| 6,151,539 | A | 11/2000 | Bergholz et al. |
| 6,873,251 | B2 | 3/2005 | Schiffmann et al. |
| | | (Continued) | |

FOREIGN PATENT DOCUMENTS

| | | |
|---|---|---|
| EP | 2168835 A1 | 3/2010 |
| JP | 2011240816 A | 12/2011 |
| KR | 20120052547 A | 5/2012 |

OTHER PUBLICATIONS

International Search Report and Written Opinion for Application No. PCT/US2019/062998 dated Mar. 19, 2020.
(Continued)

*Primary Examiner* — Anshul Sood
(74) *Attorney, Agent, or Firm* — Botos Churchill IP Law

(57) ABSTRACT

The technology relates to partially redundant equipment architectures for vehicles able to operate in an autonomous driving mode. Aspects of the technology employ fallback configurations, such as two or more fallback sensor configurations that provide some minimum amount of field of view (FOV) around the vehicle. For instance, different sensor arrangements are logically associated with different operating domains of the vehicle. Fallback configurations for computing resources and/or power resources are also provided. Each fallback configuration may have different reasons for being triggered, and may result in different types of fallback modes of operation. Triggering conditions may relate, e.g., to a type of failure, fault or other reduction in component capability, the current driving mode, environmental conditions in the vicinity of vehicle or along a planned route, or other factors. Fallback modes may involve
(Continued)

altering a previously planned trajectory, altering vehicle speed, and/or altering a destination of the vehicle.

20 Claims, 20 Drawing Sheets

(51) Int. Cl.
    *B60W 50/02* (2012.01)
    *B60W 50/029* (2012.01)
    *G05D 1/00* (2006.01)

(52) U.S. Cl.
    CPC ....... *B60W 50/0205* (2013.01); *G05D 1/0088* (2013.01); *B60W 2050/0215* (2013.01); *B60W 2420/42* (2013.01); *B60W 2420/52* (2013.01); *B60W 2420/54* (2013.01); *B60W 2710/20* (2013.01); *B60W 2720/106* (2013.01); *G05D 2201/0213* (2013.01)

(56) References Cited

U.S. PATENT DOCUMENTS

| | | |
|---|---|---|
| 9,910,441 B2 | 3/2018 | Levinson et al. |
| 2007/0293989 A1 | 12/2007 | Norris |
| 2011/0241862 A1 | 10/2011 | Debouk et al. |
| 2014/0303812 A1 | 10/2014 | Avritch et al. |
| 2015/0178998 A1 | 6/2015 | Attard et al. |
| 2016/0103450 A1 | 4/2016 | Hogenmueller et al. |
| 2017/0072967 A1 | 3/2017 | Fendt et al. |
| 2017/0090476 A1 | 3/2017 | Letwin et al. |
| 2017/0270014 A1 | 9/2017 | Poledna et al. |
| 2017/0351261 A1 | 12/2017 | Levinson et al. |
| 2019/0049958 A1* | 2/2019 | Liu .................. G01S 17/89 |
| 2020/0039530 A1* | 2/2020 | Smolyansky ............ G07C 5/02 |

OTHER PUBLICATIONS

Bento et al., "Sensor Fusion for Precise Autonomous Vehicle Navigation in Outdoor Semi-structured Environments", Proceedings of the 8th International IEEE Conference on Intelligent Transportation Systems, Vienna, Austria, Sep. 13-16, 2005, 6 pages.

Wei et al., "Towards a Viable Autonomous Driving Research Platform", Department of Electrical and Computer Engineering, Carnegie Mellon University, Pittsburgh, PA 15213, USA, 2013, 8 pages.

Sklaroff, "Redundancy Management Technique for Space Shuttle Computers", IBM J. Res. Develop., Redundancy Management, Jan. 1976, pp. 20-28.

* cited by examiner

300

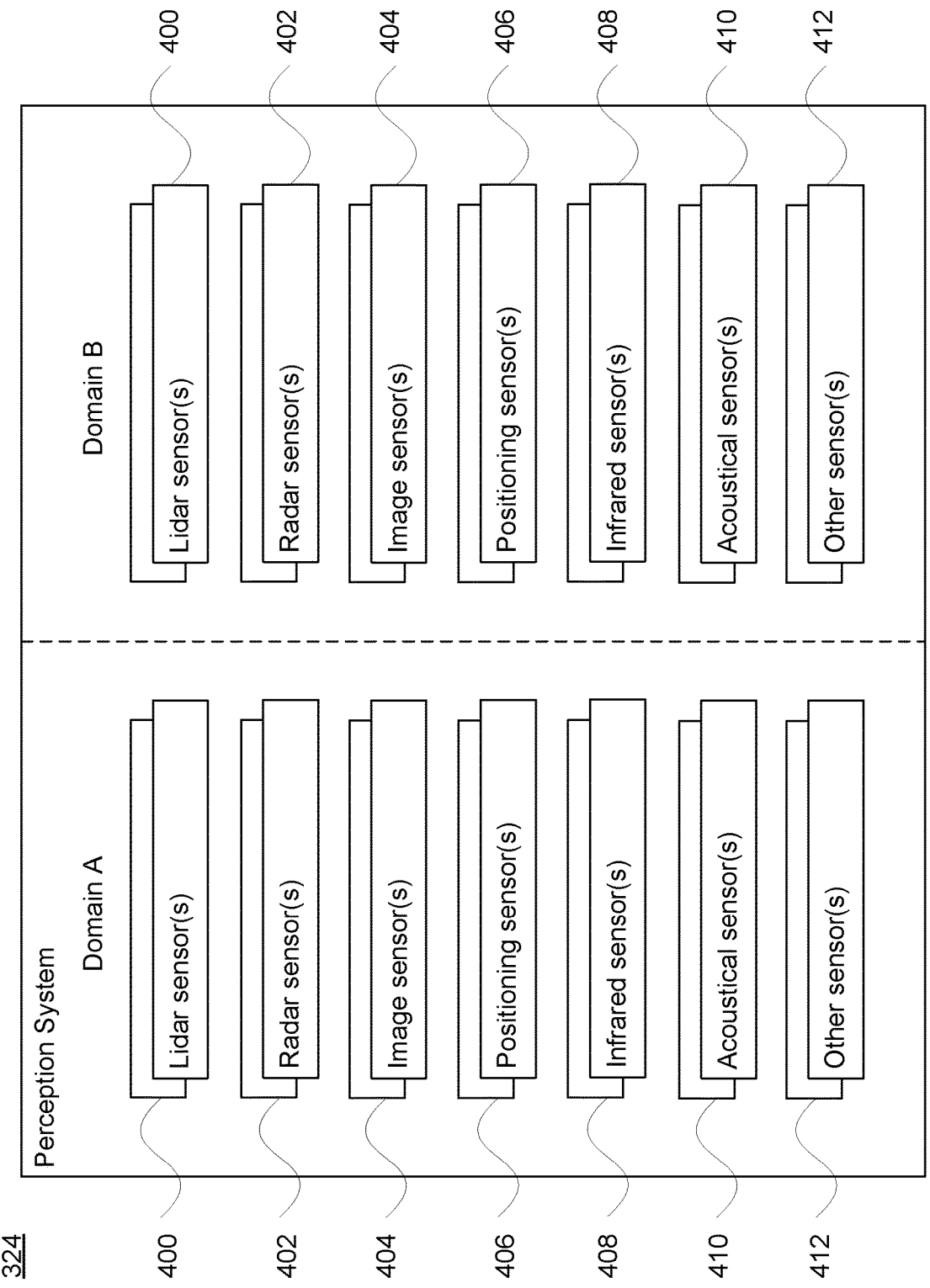

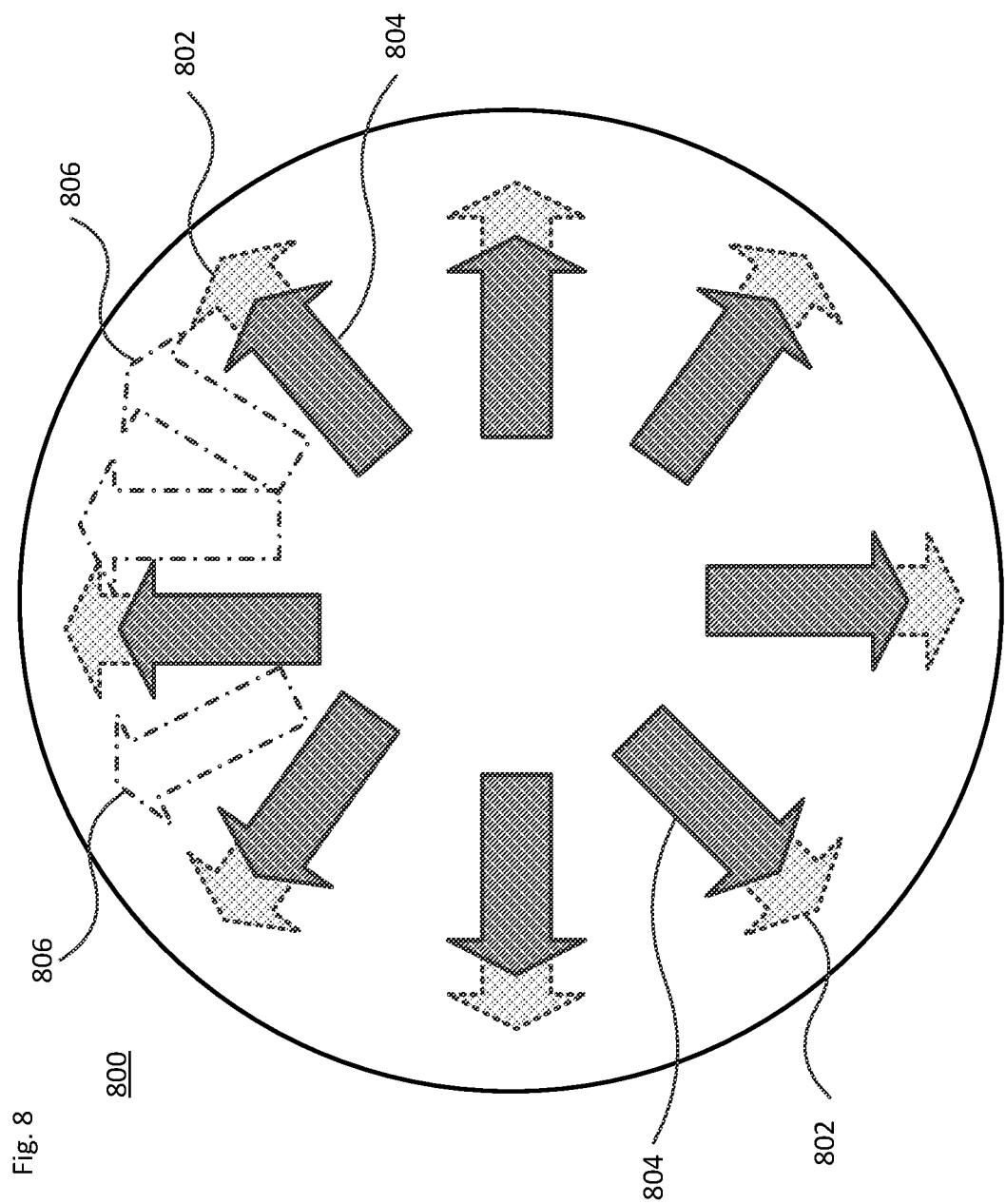

1130
1111
1116

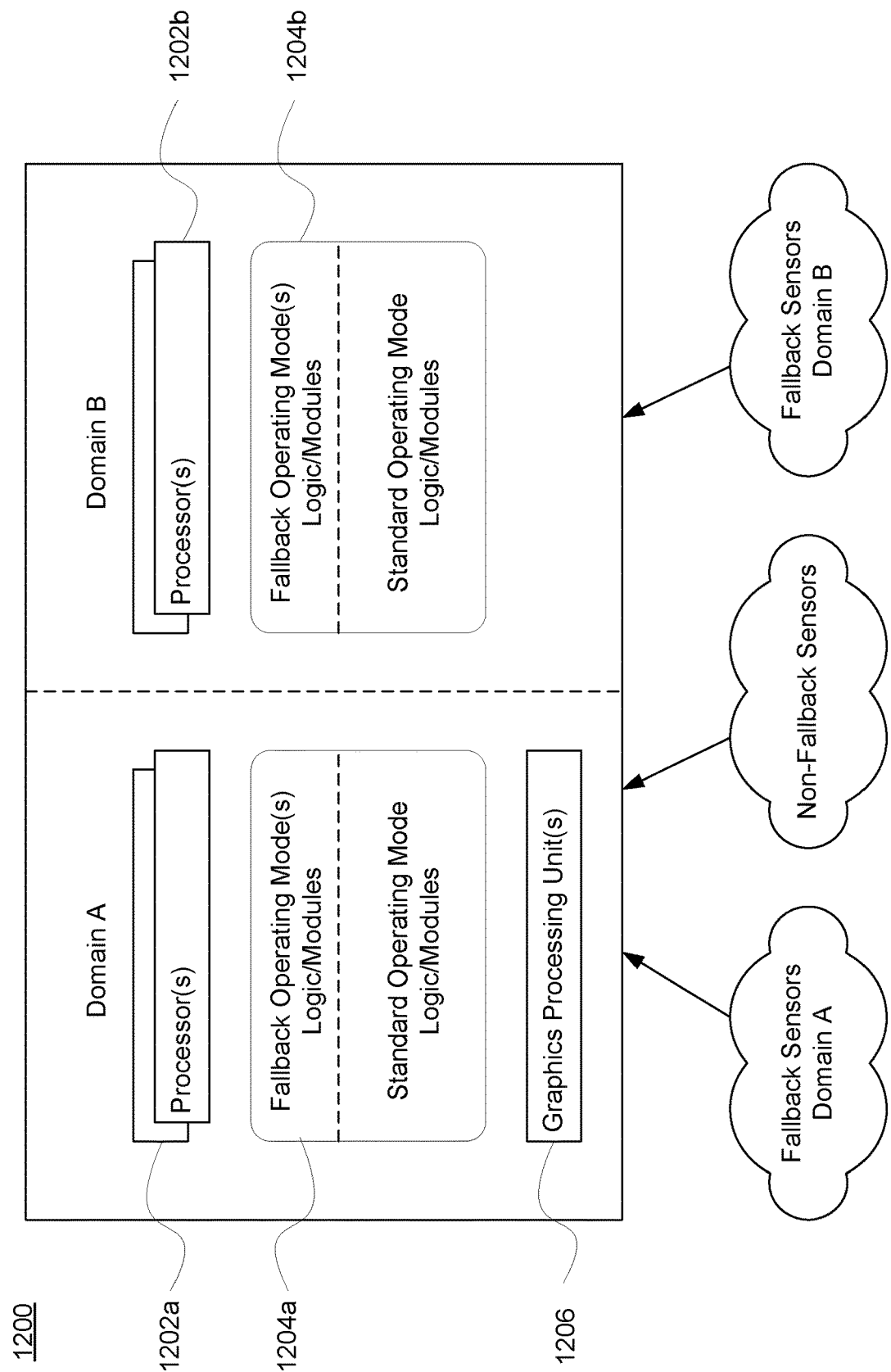

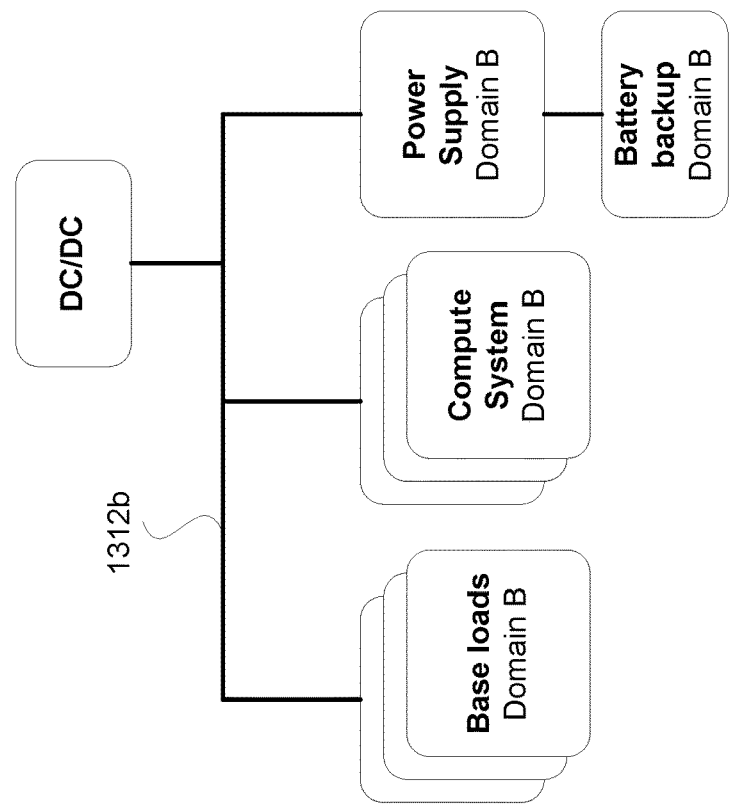
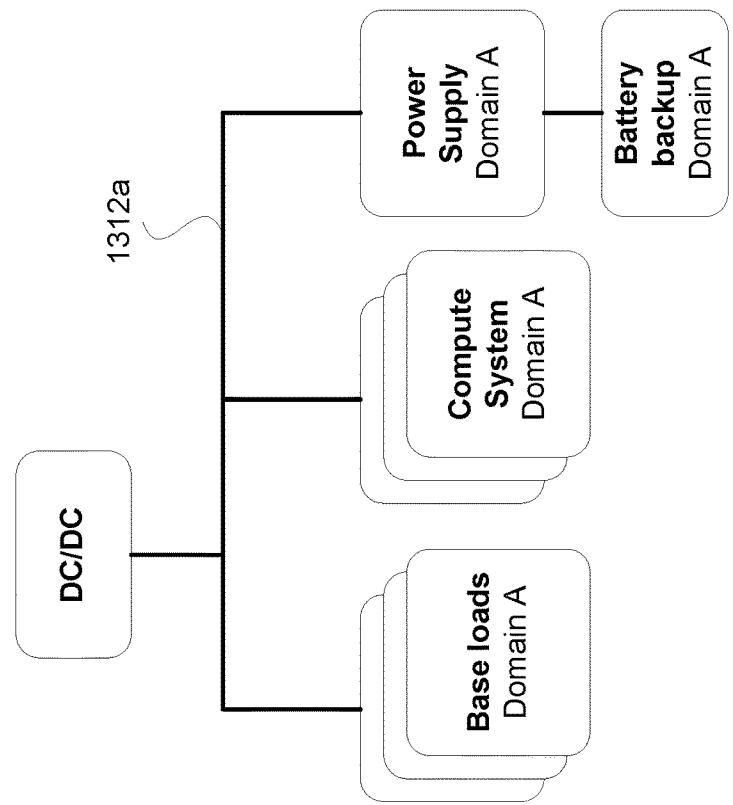
Fig. 13B    1310

REDUNDANT HARDWARE SYSTEM FOR AUTONOMOUS VEHICLES

CROSS-REFERENCE TO RELATED APPLICATIONS

The present application is related to co-pending U.S. application Ser. No. 16/180,267, entitled Systems for Implementing Fallback Behaviors for Autonomous Vehicles, filed Nov. 5, 2018, , the entire disclosure of which is incorporated by reference herein.

BACKGROUND

Autonomous vehicles, such as vehicles that do not require a human driver, can be used to aid in the transport of passengers or cargo from one location to another. Such vehicles may operate in a fully autonomous mode or a partially autonomous mode where a person may provide some driving input. In order to operate in an autonomous mode, the vehicle may employ sensors, and use received sensor information to perform various driving operations. However, if a sensor or other component of the system fails or otherwise suffers a degradation in capability, this may adversely impact the driving capabilities of the vehicle.

BRIEF SUMMARY

The technology relates to redundant architectures for sensor, compute and power systems in vehicles configured to operate in fully or partially autonomous driving modes. While it may be possible to have complete redundancy of every component and subsystem, this may not be feasible, especially with vehicles that have constraints on the size and placement of sensor suites and other limiting factors such as cost. Thus, aspects of the technology employ fallback configurations for partial redundancy. For instance, the fallback sensor configurations may provide some minimum amount of field of view (FOV) around the vehicle, as well as a minimum amount of computing power for perception and planning processing.

According to aspects of the technology, a vehicle is configured to operate in an autonomous driving mode. The vehicle comprises a driving system, a perception system and a control system. The driving system includes a steering subsystem, an acceleration subsystem and a deceleration subsystem to control driving of the vehicle in the autonomous driving mode. The perception system has a plurality of sensors configured to detect information about an environment around the vehicle. The plurality of sensors includes a first set of sensors associated with a first operating domain and a second set of sensors associated with a second operating domain. The control system is operatively coupled to the driving system and the perception system. The control system includes a first computing subsystem associated with the first operating domain and a second computing subsystem associated with the second operating domain. Each of the first and second computing subsystems having one or more processors. The first and second computing subsystems are each configured to receive sensor data from one or both of the first set of sensors and the second set of sensors in a first mode of operation. In response to the received sensor data in the first mode of operation, the control system is configured to control the driving system to drive the vehicle in the autonomous driving mode. Upon an error condition for one or more of the plurality of sensors, the first computing subsystem is configured to process sensor data from the first set of sensors in the first operating domain and the second computing subsystem is configured to process sensor data from the second set of sensors in the second operating domain. And in response to the error condition, only one of the first computing subsystem or the second computing subsystem is configured to control the driving system in a fallback driving mode.

In an example, each of the first and second sets of sensors include at least one sensor selected from the group consisting of lidar sensors, radar sensors, camera sensors, auditory sensors and positioning sensors. Here, each of the first and second sets of sensors may include a respective group of lidar, radar and camera sensors, each group providing a selected field of view of the environment around the vehicle.

Each of the sensors in the first set of sensors may have a respective field of view, each of the sensors in the second set of sensors may have a respective field of view, and in this case the respective fields of view of the second set of sensors are different from the respective fields of view of the first set of sensors. One or more interior sensors may be disposed in an interior of the vehicle. The one or more interior sensors include at least one of a camera sensor, an auditory sensor and an infrared sensor.

In another example, the fallback driving mode includes a first fallback mode and a second fallback mode. The first fallback mode includes a first set of driving operations and the second fallback mode includes a second set of driving operations different from the first set of driving operations. In this example, the first computing subsystem is configured to control the driving system in the first fallback mode and the second computing subsystem is configured to control the driving system in the second fallback mode.

In yet another example, the vehicle further comprises first and second power distribution subsystems. Here, in the fallback driving mode the first power distribution subsystem is associated with the first operating domain to power only devices of the first operating domain. Also in the fallback driving mode the second power distribution system is associated with the second operating domain to power only devices of the second operating domain. And the first and second operating domains are electrically isolated from one another. In this case, the first power distribution subsystem may be configured to provide power to a first set of base vehicle loads in the first mode of operation and to provide power to devices of the first operating domain in the fallback driving mode, and the second power distribution subsystem may be configured to provide power to a second set of base vehicle loads different than the first set of base vehicle loads in the first mode of operation and to provide power to devices of the second operating domain in the fallback driving mode.

In a further example, the plurality of sensors of the perception system include a first set of fallback sensors operatively coupled to the first computing subsystem, a second set of fallback sensors operatively coupled to the second computing subsystem, and a set of non-fallback sensors. In this scenario, the set of non-fallback sensors may be operatively coupled to one or both of the first computing subsystem and the second computing subsystem. And in yet another example, the plurality of sensors of the perception system include a subset of sensors operatively coupled to both the first and second computing subsystems in the fallback driving mode.

A method of operating a vehicle in an autonomous driving mode is provided according to another aspect of the technology. The method comprises detecting, by a plurality of sensors of a perception system of the vehicle, information about an environment around the vehicle, the plurality of sensors including a first set of sensors associated with a first operating domain and a second set of sensors associated with a second operating domain; receiving, by a control system of the vehicle, the detected information about the environment around the vehicle as sensor data, the control system including a first computing subsystem associated with the first operating domain and a second computing subsystem associated with the second operating domain; in response to receiving the sensor data in a first mode of operation, the control system controlling a driving system of the vehicle to drive the vehicle in the autonomous driving mode; detecting an error condition for one or more of the plurality of sensors; upon detecting the error condition, the first computing subsystem processing sensor data from only the first set of sensors in the first operating domain and the second computing subsystem processing sensor data from only the second set of sensors in the second operating domain; and in response to the error condition, only one of the first computing subsystem or the second computing subsystem controlling the driving system in a fallback driving mode.

In one example, the fallback driving mode comprises a plurality of fallback modes including a first fallback mode and a second fallback mode. In this case, the first fallback mode may include a first set of driving operations and the second fallback mode may include a second set of driving operations different from the first set of driving operations. In this case, controlling the driving system in the fallback driving mode may include the first computing subsystem controlling the driving system in the first fallback mode; or the second computing subsystem controlling the driving system in the second fallback mode.

In another example, the method further comprises, in the fallback driving mode, powering, by a first power distribution subsystem of the vehicle, only devices of the first operating domain; and powering, by a second power distribution subsystem of the vehicle, only devices of the second operating domain. In this scenario, the first power distribution subsystem may provide power to a first set of base vehicle loads in the first mode of operation and power to devices of the first operating domain in the fallback driving mode; and the second power distribution subsystem may provide power to a second set of base vehicle loads different than the first set of base vehicle loads in the first mode of operation and power to devices of the second operating domain in the fallback driving mode.

During the fallback driving mode, a subset of the plurality of sensors of the perception system may provide sensor data to both the first and second computing subsystems. Controlling the driving system in the fallback driving mode may include at least one of altering a previously planned trajectory of the vehicle, altering a speed of the vehicle, or altering a destination of the vehicle. The method may also further comprise halting processing of sensor data from a non-fallback-critical sensor during the fallback driving mode.

BRIEF DESCRIPTION OF THE DRAWINGS

FIG. 4 is a block diagram of an example perception system in accordance with aspects of the technology.

FIG. 8 illustrates an example of sensor orientations in accordance with aspects of the disclosure.

FIG. 12 illustrates an example self-driving system configuration in accordance with aspects of the technology.

FIGS. 13A-B illustrate example power distribution configurations in accordance with aspects of the technology.

DETAILED DESCRIPTION

The partially redundant vehicle architectures discussed herein are associated with fallback configurations that employ different sensor arrangements that can be logically associated with different operating domains of the vehicle. Each fallback configuration may have different reasons for being triggered, and may result in different types of fallback modes of operation. Triggering conditions may relate, e.g., to a type of failure, fault or other reduction in component capability, the current autonomous driving mode, environmental conditions in the vicinity of vehicle or along a planned route, or other factors.

Example Vehicle Systems

Figure 1:
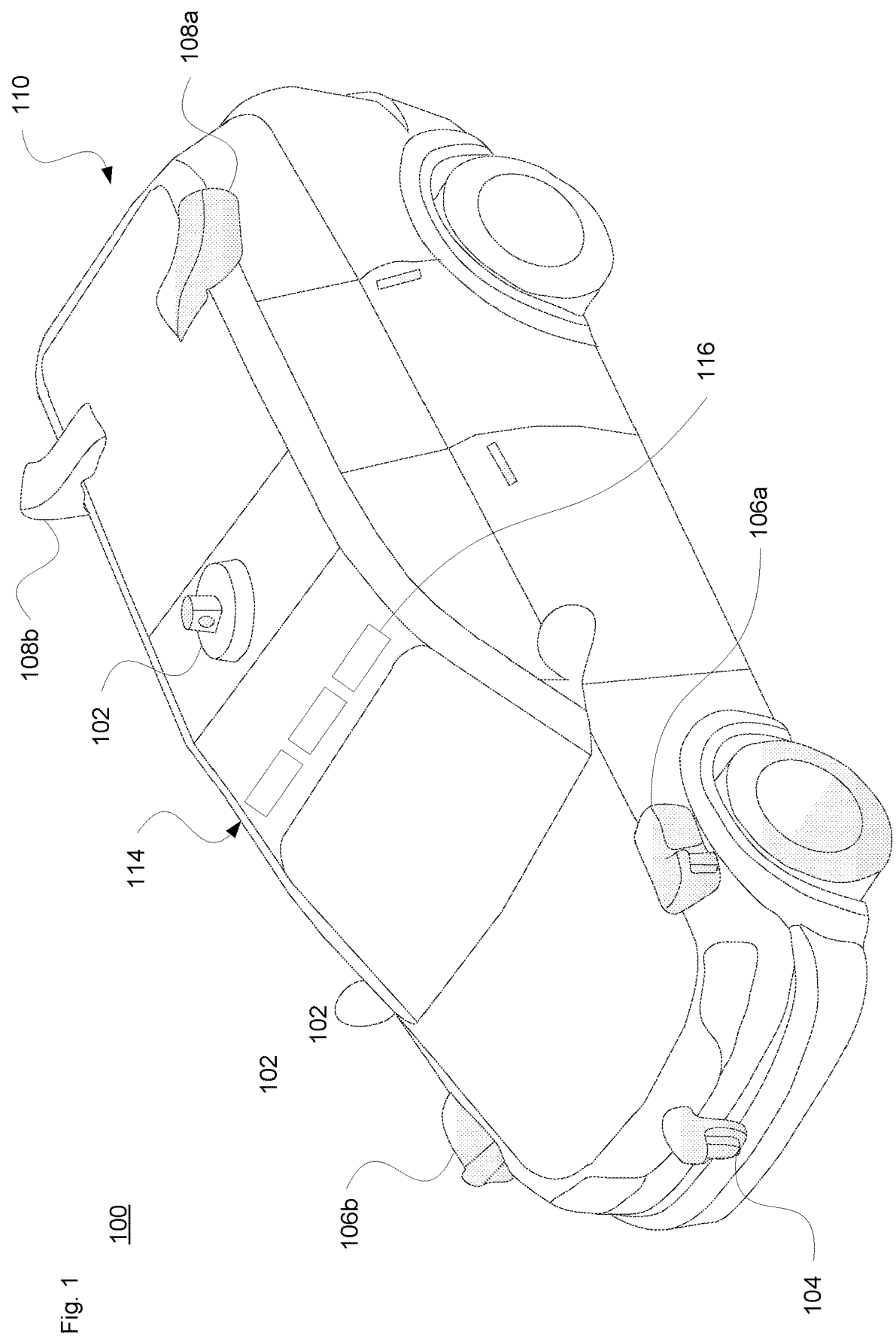
FIG. 1 illustrates a perspective view an example vehicle configured for use with aspects of the technology.
Figure 2:
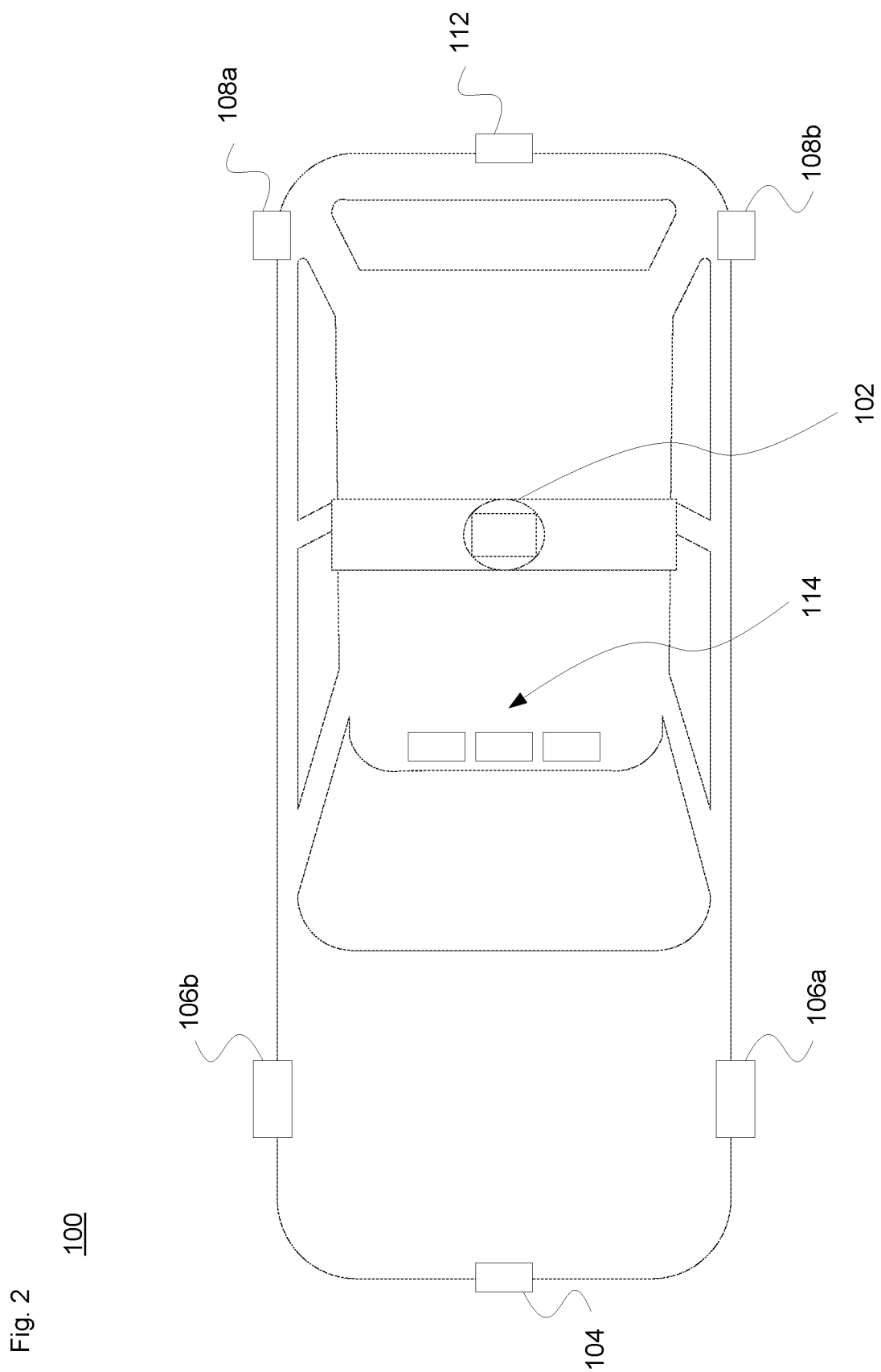
FIG. 2 illustrates a top view of the example vehicle of FIG. 1.

FIG. 1 illustrates a perspective view of a passenger vehicle 100, such as a minivan, sedan or sport utility vehicle. FIG. 2 illustrates a top-down view of the passenger vehicle 100. The passenger vehicle 100 may include various sensors for obtaining information about the vehicle's external environment. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle may each incorporate a lidar or other sensor. For example, housing 106a may be located in front of the driver's side door along a quarterpanel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 2) may be positioned along the read of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces. The interior sensor(s) may include at least one of a camera sensor, an auditory sensor and an infrared sensor.

While certain aspects of the disclosure may be particularly useful in connection with specific types of vehicles, the vehicle may be any type of vehicle including, but not limited to, cars, trucks, motorcycles, buses, recreational vehicles, etc.

Figure 3:
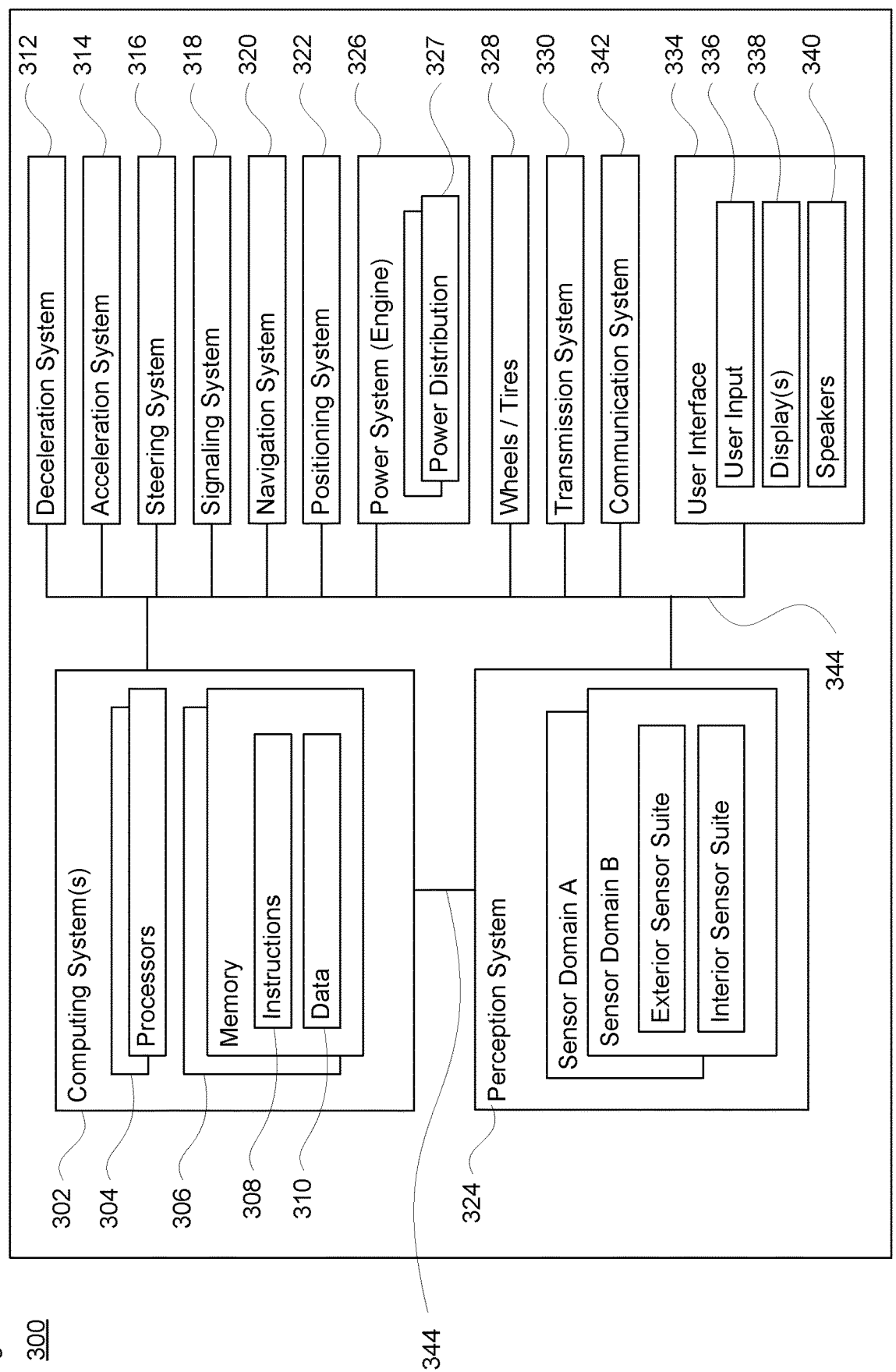
FIG. 3 is a block diagram of an example vehicle in accordance with aspects of the technology.

FIG. 3 illustrates a block diagram 300 with various components and systems of an exemplary vehicle configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As illustrated in FIG. 3, the exemplary vehicle includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The computing system may control overall operation of the vehicle when operating in an autonomous mode.

The memory 306 stores information accessible by the processors 304, including instructions 308 and data 310 that may be executed or otherwise used by the processor 304. The memory 306 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 308 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The data 310 may be retrieved, stored or modified by one or more processors 304 in accordance with the instructions 308. In one example, some or all of the memory 306 may be an event data recorder or other secure data storage system configured to store vehicle diagnostics and/or detected sensor data, which may be on board the vehicle or remote, depending on the implementation.

The processors 304 may be any conventional processors, such as commercially available CPUs. Alternatively, each processor may be a dedicated device such as an ASIC or other hardware-based processor. Although FIG. 3 functionally illustrates the processors, memory, and other elements of computing devices 302 as being within the same block, such devices may actually include multiple processors, computing devices, or memories that may or may not be stored within the same physical housing. Similarly, the memory 306 may be a hard drive or other storage media located in a housing different from that of the processor(s) 304. Accordingly, references to a processor or computing device will be understood to include references to a collection of processors or computing devices or memories that may or may not operate in parallel.

In one example, the computing devices 302 may form an autonomous driving computing system incorporated into vehicle 100. The autonomous driving computing system may capable of communicating with various components of the vehicle. For example, the computing devices 302 may be in communication with various systems of the vehicle, including a driving system including a deceleration system 312 (for controlling braking of the vehicle), acceleration system 314 (for controlling acceleration of the vehicle), steering system 316 (for controlling the orientation of the wheels and direction of the vehicle), signaling system 318 (for controlling turn signals), navigation system 320 (for navigating the vehicle to a location or around objects) and a positioning system 322 (for determining the position of the vehicle). The autonomous driving computing system may operate in part as a planner, in accordance with the navigation system 320 and the positioning system 322, e.g., for determining a route from a starting point to a destination.

The computing devices 302 are also operatively coupled to a perception system 324 (for detecting objects in the vehicle's environment), a power system 326 (for example, a battery and/or gas or diesel powered engine) and a transmission system 330 in order to control the movement, speed, etc., of the vehicle in accordance with the instructions 308 of memory 306 in an autonomous driving mode which does not require or need continuous or periodic input from a passenger of the vehicle. Some or all of the wheels/tires 328 are coupled to the transmission system 330, and the computing devices 302 may be able to receive information about tire pressure, balance and other factors that may impact driving in an autonomous mode. The power system 326 may have multiple power distribution elements 327, each of which may be capable of supplying power to selected components and other systems of the vehicle.

The computing devices 302 may control the direction and speed of the vehicle by controlling various components. By way of example, computing devices 302 may navigate the vehicle to a destination location completely autonomously using data from the map information and navigation system 320. Computing devices 302 may use the positioning system 322 to determine the vehicle's location and the perception system 324 to detect and respond to objects when needed to reach the location safely. In order to do so, computing devices 302 may cause the vehicle to accelerate (e.g., by increasing fuel or other energy provided to the engine by acceleration system 314), decelerate (e.g., by decreasing the fuel supplied to the engine, changing gears, and/or by applying brakes by deceleration system 312), change direction (e.g., by turning the front or other wheels of vehicle 100 by steering system 316), and signal such changes (e.g., by lighting turn signals of signaling system 318). Thus, the acceleration system 314 and deceleration system 312 may be a part of a drivetrain or other type of transmission system 330 that includes various components between an engine of the vehicle and the wheels of the vehicle. Again, by controlling these systems, computing devices 302 may also control the transmission system 330 of the vehicle in order to maneuver the vehicle autonomously.

Navigation system 320 may be used by computing devices 302 in order to determine and follow a route to a location. In this regard, the navigation system 320 and/or memory 306 may store map information, e.g., highly detailed maps that computing devices 302 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 324 also includes sensors for detecting objects external to the vehicle. The detected objects may be other vehicles, obstacles in the roadway, traffic signals, signs, trees, etc. As will be discussed in more detail below, the perception system 324 is arranged to operate with two (or more) sensor domains, such as sensor domain A and sensor domain B as illustrated. Within each domain, the system may include one or both of an exterior sensor suite and an interior sensor suite. As discussed further below, the exterior sensor suite employs one or more sensors to detect objects and conditions in the environment external to the vehicle. The interior sensor suite may employ one or more other sensors to detect objects and conditions within the vehicle, such as in the passenger compartment.

FIG. 4 illustrates one example of the perception system 324. For instance, as shown each domain of the perception system 324 may include one or more light detection and ranging (lidar) sensors 400, radar units 402, cameras 404 (e.g., optical imaging devices, with or without a neutral-density filter (ND) filter), positioning sensors 406 (e.g., gyroscopes, accelerometers and/or other inertial components), infrared sensors 408, acoustical sensors 410 (e.g., microphones or sonar transducers), and/or any other detection devices 412 that record data which may be processed by computing devices 302. The sensors of the perception system 324 in the exterior sensor suite may detect objects outside of the vehicle and their characteristics such as location, orientation, size, shape, type (for instance, vehicle, pedestrian, bicyclist, etc.), heading, and speed of movement, etc. The sensors of the interior sensor suite may detect objects within the vehicle (e.g., person, pet, packages) as well as conditions within the vehicle (e.g., temperature, humidity, etc.).

The raw data from the sensors and the aforementioned characteristics can be processed by the perception system 324 and/or sent for further processing to the computing devices 302 periodically and continuously as the data is generated by the perception system 324. Computing devices 302 may use the positioning system 322 to determine the vehicle's location and perception system 324 to detect and respond to objects when needed to reach the location safely. In addition, the computing devices 302 may perform calibration of individual sensors, all sensors in a particular sensor assembly, or between sensors in different sensor assemblies or other physical housings.

As illustrated in FIGS. 1-2, certain sensors of the perception system 324 may be incorporated into one or more sensor assemblies or housings. In one example, these may be arranged as sensor towers integrated into the side-view mirrors on the vehicle. In another example, other sensors may be part of the roof-top housing 102. The computing devices 202 may communicate with the sensor assemblies located on or otherwise distributed along the vehicle. Each assembly may have one or more types of sensors such as those described above.

Returning to FIG. 3, computing devices 302 may include all of the components normally used in connection with a computing device such as the processor and memory described above as well as a user interface subsystem 334. The user interface subsystem 334 may include one or more user inputs 336 (e.g., a mouse, keyboard, touch screen and/or microphone) and one or more display devices 338 (e.g., a monitor having a screen or any other electrical device that is operable to display information). In this regard, an internal electronic display may be located within a cabin of the vehicle (not shown) and may be used by computing devices 302 to provide information to passengers within the vehicle. Other output devices, such as speaker(s) 340 may also be located within the passenger vehicle.

The passenger vehicle also includes a communication system 342. For instance, the communication system 342 may also include one or more wireless network connections to facilitate communication with other computing devices, such as passenger computing devices within the vehicle, and computing devices external to the vehicle such as in another nearby vehicle on the roadway or a remote server system. The network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

As illustrated in FIG. 3, the system may include one or more buses 344 for transmitting information and/or power. The buses are able to provide direct or indirect connectivity between various components and subsystems. For instance, a data communication bus may provide bidirectional communication between cameras and other sensors of the perception system 324 and the computing devices 302. A power line may be connected directly or indirectly to the power distribution elements 327 of power system 326, or to a separate power source such as a battery controlled by the computing devices 302. Various protocols may be employed for uni- or bi-directional dada communication. By way of example, a protocol using the Controller Area Network (CAN) bus architecture, or an Ethernet-based technology such as 100Base-T1 (or 1000Base-T1 or 10GBase-T) Ethernet may be employed. Other protocols such as FlexRay can also be employed. Still further, an Automotive Audio Bus® (A2B) and/or other bus configurations may employed.

Example Implementations

In view of the structures and configurations described above and illustrated in the figures, various implementations will now be described in accordance with aspects of the technology.

Partial Redundancy—Sensor Fallback Modes

Figure 5A:
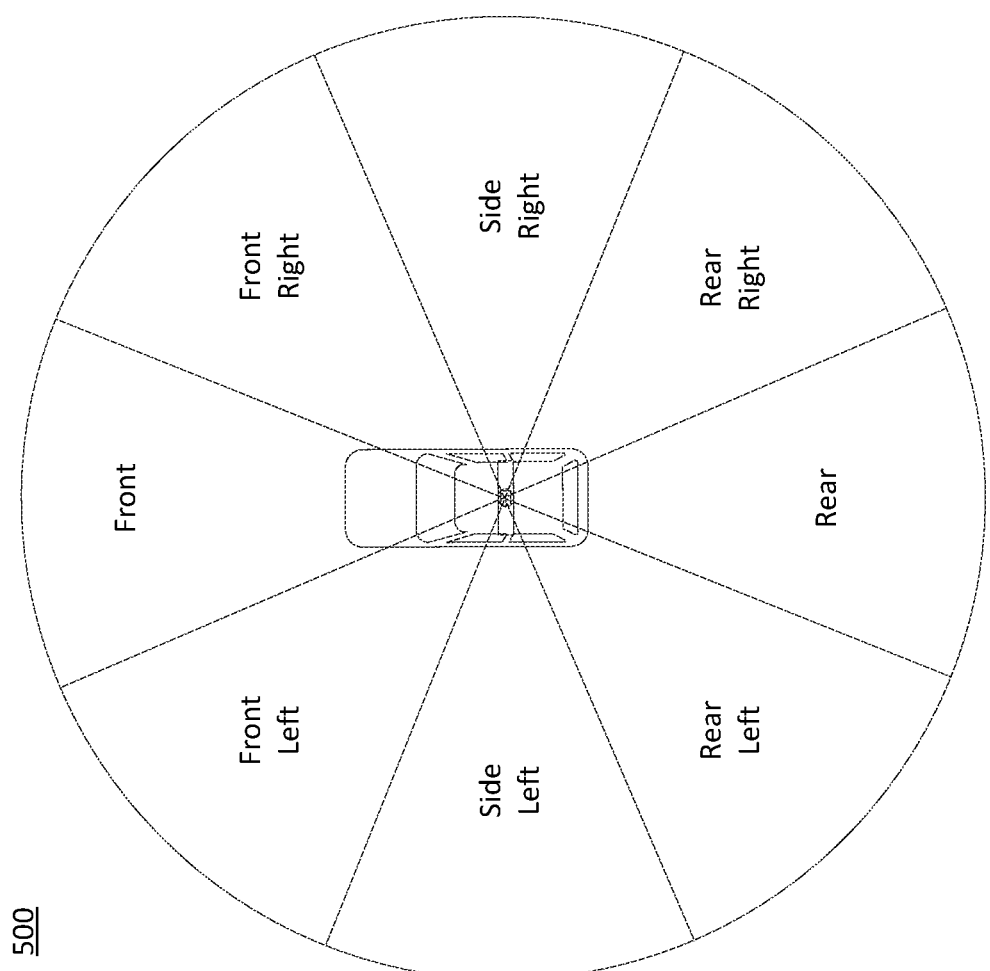
FIGS. 5A-B illustrate examples of regions around a vehicle in accordance with aspects of the disclosure.

The environment around the vehicle can be viewed as having different quadrants or regions. One example of this is illustrated in FIG. 5A, which shows front, rear, right side and left side regions, as well as adjacent areas for the front right, front left, right rear and left rear areas around the vehicle. These regions are merely exemplary.

Figure 5B:
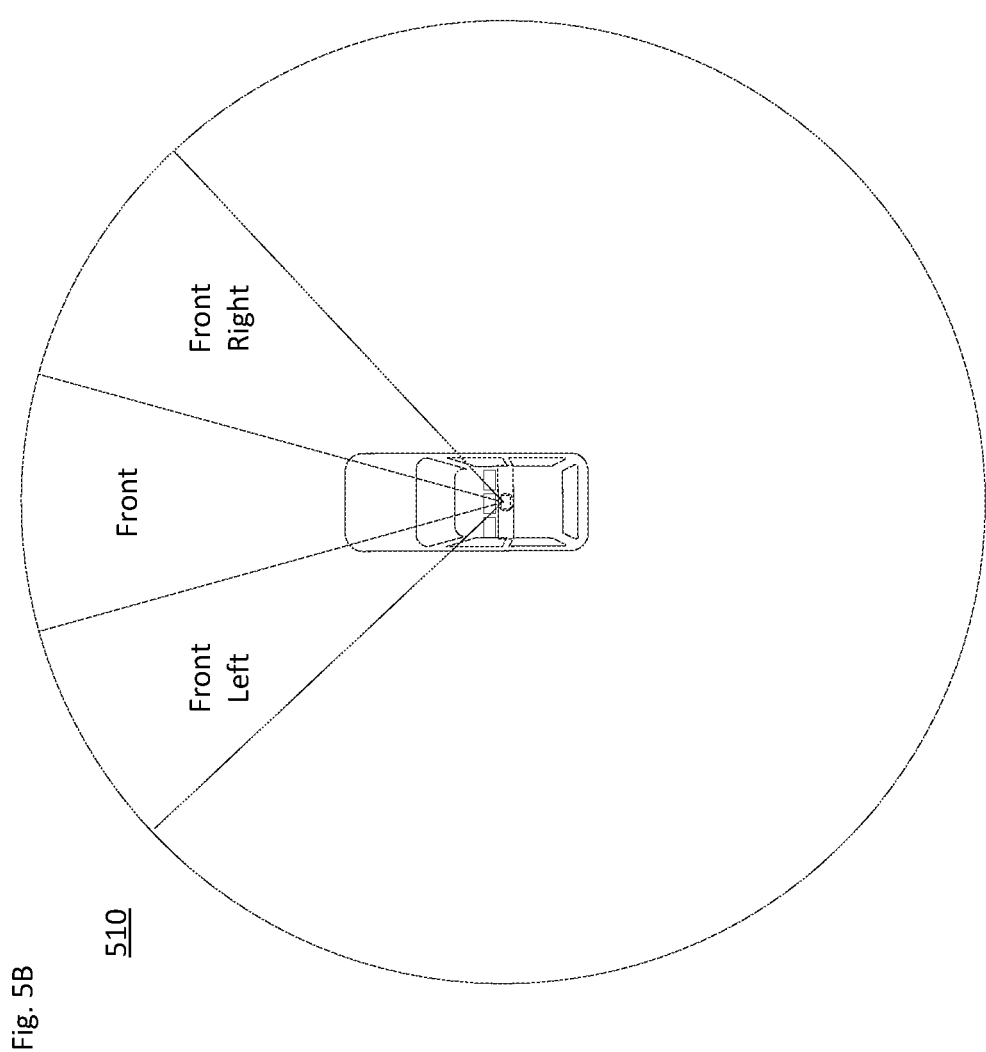

Various sensors may be located at different places around the vehicle (see FIGS. 1-2) to gather data from some or all of these regions. For instance, as seen in FIG. 5B, the three sensors 116 of FIG. 1 may primarily receive data from the front, front left and front right regions around the vehicle.

Certain sensors may have different fields of view depending on their placement around the vehicle and the type of information they are designed to gather. For instance, different lidar sensors may be used for near (short range) detection of objects adjacent to the vehicle (e.g., less than 2-10 meters), while others may be used for far (long range) detection of objects a hundred meters (or more or less) in front of the vehicle. Mid-range lidars may also be employed. Multiple radar units may be positioned toward the front, rear and/or sides of the vehicle for long-range object detection. And cameras may be arranged to provide good visibility around the vehicle. Depending on the configuration, certain types of sensors may include multiple individual sensors with overlapping fields of view. Alternatively, other sensors may provide redundant 360° fields of view.

Figure 6:
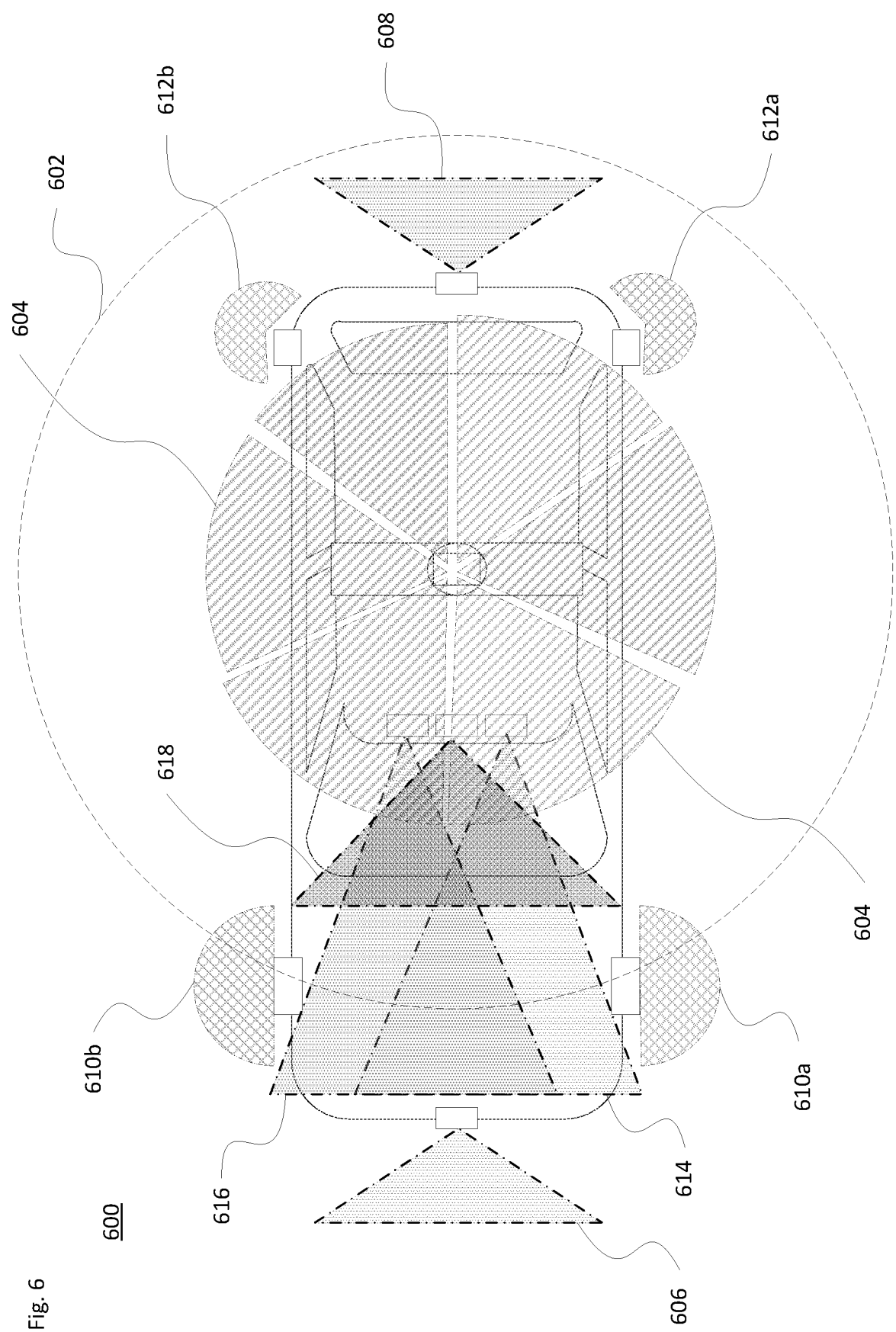
FIG. 6 illustrates example sensor fields of view in accordance with aspects of the disclosure.

FIG. 6 provides one example 600 of sensor fields of view relating to the sensors illustrated in FIG. 2. Here, should the roof-top housing 102 include a lidar sensor as well as various cameras, radar units, infrared and/or acoustical sensors, each of those sensors may have a different field of view. Thus, as shown, the lidar sensor may provide a 360° FOV 602, while cameras arranged within the housing 102 may have individual FOVs 604. A sensor within housing 104 at the front end of the vehicle has a forward facing FOV 606, while a sensor within housing 112 at the rear end has a rearward facing FOV 608. The housings 106a, 106b on the driver's and passenger's sides of the vehicle, respectively, may each incorporate a lidar and/or other sensor having a respective FOV 610a or 610b. Similarly, sensors within housings 108a, 108b located towards the rear roof portion of the vehicle each have a respective FOV 612a or 612b. And the series of sensor units 116 arranged along a forward-facing direction of the vehicle may have respective FOVs 614, 616 and 618. Each of these fields of view is merely exemplary and not to scale in terms of coverage range.

Figure 7:
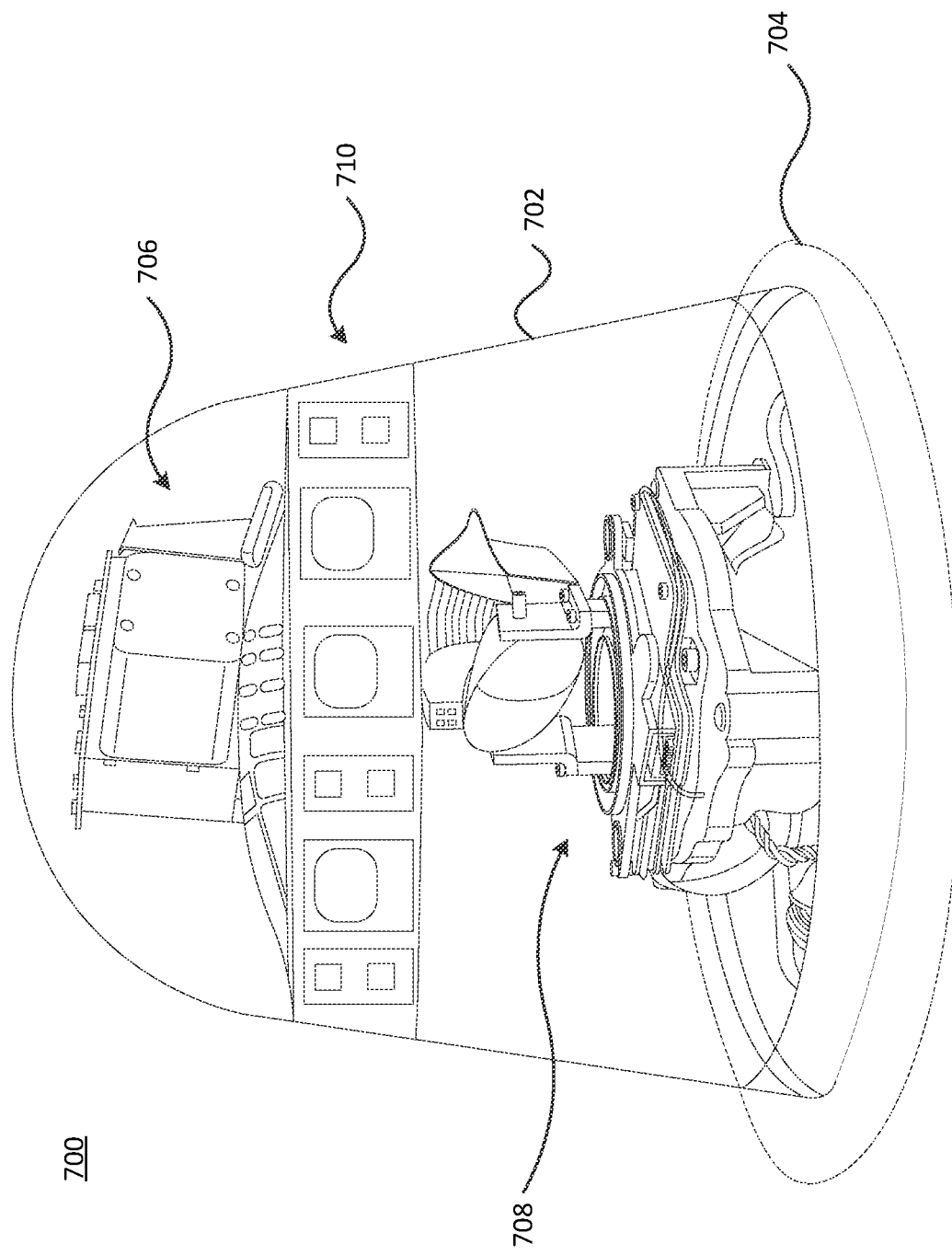
FIG. 7 illustrates an example sensor assembly in accordance with aspects of the disclosure.

As noted above, multiple sensors may be arranged in a given housing or as an assembly. One example is shown in FIG. 7. This figure presents an example 700 of a sensor assembly in accordance with aspects of the disclosure. As shown, the sensor assembly includes a housing 702, which is mounted to a portion 704 of a roof of the vehicle as shown by the dashed line. The housing 702 may be dome-shaped as shown, cylindrical, hemispherical, or have a different geometric shape. Within the housing 702 is a first sensor 706 arranged remotely or away from the roof and a second sensor 708 arranged closer to the roof. One or both of the sensors 706 and 708 may be LIDARs or other types of sensors. Disposed between the first sensor 706 and the second sensor 708 is an imaging assembly 710. The imaging assembly 710 includes one or more sets of cameras arranged therealong. The housing 702 may be optically transparent at least along the places where the cameras are arranged. While not illustrated in FIG. 7, one or more processors, such as processors 304 of FIG. 3, may be included as part of the sensor assembly. The processors may be configured to process the raw imagery received from the various image sensors of the camera assembly, as well as information received from the other sensors of the overall sensor assembly.

Depending on the configuration, various sensors may be arranged to provide complementary and/or overlapping fields of view. For instance, the camera assembly 710 may include a first subsystem having multiple pairs of image sensors positioned to provide an overall 360° field of view around the vehicle. The camera assembly 710 may also include a second subsystem of image sensors generally facing toward the front of the vehicle, for instance to provide higher resolutions, different exposures, different filters and/or other additional features, e.g., at an approximately 90° front field of view, e.g., to better identify objects on the road ahead. The field of view of this subsystem may also be larger or smaller than 90°, for instance between about 60-135°. FIG. 8 provides an example 800 of the orientations of the various image sensors of the first and second subsystems. The image sensors may be CMOS sensors, although CCD or other types of imaging elements may be employed.

The elevation of the camera, lidar and/or other sensor subsystems will depend on placement of the various sensors on the vehicle and the type of vehicle. For instance, if the camera assembly 710 is mounted on or above the roof of a large SUV, the elevation will typically be higher than when the camera assembly is mounted on the roof of a sedan or sports car. Also, the visibility may not be equal around all areas of the vehicle due to placement and structural limitations. By varying the diameter of the camera assembly 710 and the placement on the vehicle, a suitable 360° field of view can be obtained. For instance, the diameter of the camera assembly 710 may vary from e.g., between 0.25 to 1.0 meters, or more or less. The diameter may be selected to be larger or smaller depending on the type of vehicle on which the camera assembly is to be placed, and the specific location it will be located on the vehicle.

As shown in FIG. 8, each image sensor pair of a first subsystem of the camera assembly may include a first image sensor 802 and a second image sensor 804. The first and second image sensors may be part of separate camera elements, or may be included together in one camera module. In this scenario, the first image sensors 802 may be set to auto exposure, while the second image sensors 804 may be set to a fixed exposure, e.g., using a dark or ND filter. As illustrated, 8 pairs of image sensors are shown, although more or fewer pairs may be employed. The second image subsystem includes image sensors 806, which may have a higher resolution than those of the first and second image sensors. This enhanced resolution may be particularly beneficial for cameras facing the front of the vehicle, in order to provide the perception system 324 with as much detail of the scene in front of the vehicle as possible. FIG. 8 illustrates 3 image sensors of the second subsystem, although more or fewer image sensors may be used. In the present example, 19 total image sensors are incorporated into the camera assembly 710, including the 3 from the second subsystem and 8 pairs from the first subsystem. Again, more or fewer image sensors may be employed in the camera assembly.

The exact field of view for each image sensor may vary, for instance depending on features of the particular sensor. By way of example, the image sensors 802 and 804 may have approximately 50° FOVs, e.g., 49°-51°, while the image sensors 806 may each have a FOV on the order of 30° or slightly more, e.g., 5-10% more. This allows for overlap in the FOV for adjacent image sensors.

The selected amount of overlap is beneficial, as seams or gaps in the imagery or other data generated by the various sensors are undesirable. In addition, the selected overlap enables the processing system to avoid stitching images together. While image stitching may be done in conventional panoramic image processing, it can be computationally challenging to do in a real-time situation where the vehicle is operating in a self-driving mode. Reducing the amount of time and processing resources required greatly enhances the responsiveness of the perception system as the vehicle drives.

Figure 9B:
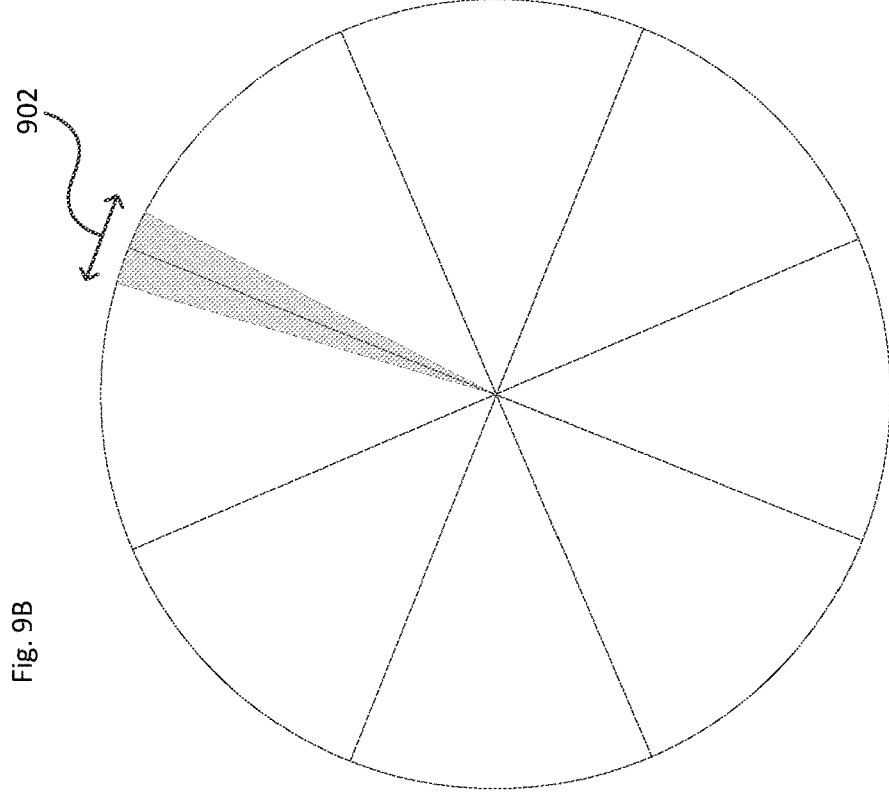
FIGS. 9A-B illustrate examples of overlapping sensor fields of view in accordance with aspects of the disclosure.
Figure 9A:
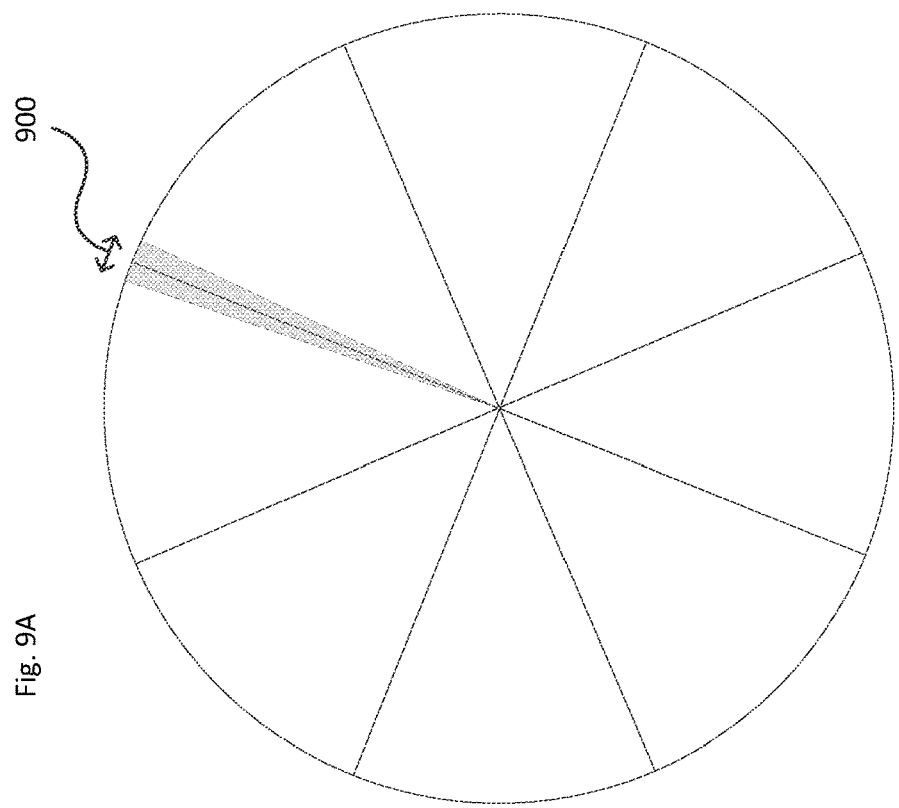

FIGS. 9A-B illustrate two examples of image sensor overlap between adjacent sensor regions. As shown, for image sensors covering the front and front right regions around the vehicle, there may be an overlap 900 (FIG. 9A) of between 0.5-5°, or alternatively no more than 6-10° of overlap. This overlap 900 may apply for one type of sensor, such as image sensors 802 of FIG. 8. A different overlap may apply for another type of sensor. For instance, there may be an overlap 902 (FIG. 9B) of between 2-8°, or alternatively no more than 8-12° of overlap for image sensors 804 of FIG. 8. Larger or smaller overlaps may also be engineered for the system depending on, e.g., vehicle type, size, sensor type, etc.

Example Scenarios

As noted above, should a sensor or other component fail or encounter a reduction in capability, it may limit the driving capabilities of the vehicle or prevent operation entirely. For instance, one or more sensors may encounter an error due to, e.g., a mechanical or electrical failure, degradation due to environmental conditions (such as extreme cold, snow, ice, mud or dust occlusion), or other factors. In such situations, fallback configurations are designed to provide at least a minimum amount of sensor information so that the perception and planning systems can operate according to given operating mode. The operating mode may include, e.g., completing a current driving activity (e.g., passenger drop off at desired location) before being serviced, altering a route and/or speed (e.g., exit a freeway and drive along surface streets, reduce speed to minimum posted limit for the route, etc.), or pulling over as soon as it is safe to do so.

By way of example, the fallback configurations may be associated with two distinct domains, e.g., domain A and domain B (see FIGS. 3-4). Each domain does not need to be a mirror image of the other. For example, certain sets of front-facing sensors may be allocated to domain A, while a different set of front-facing sensors with different capabilities may be allocated to domain B. In one scenario, each type of sensor may be included in each domain. In another scenario, at least one (set of) front-facing camera(s) is always available in each domain for traffic light detection. In a further scenario, at least one sensor with a 360° field of view is allocated to each domain for detection and classification of objects external to the vehicle. And in yet another scenario, one or more sensors may each be operatively part of both domains. Thus, there may be differences in capabilities based on whether the system is using the sensors of only domain A, only domain B, or a combination of domains A & B.

Figure 10A:
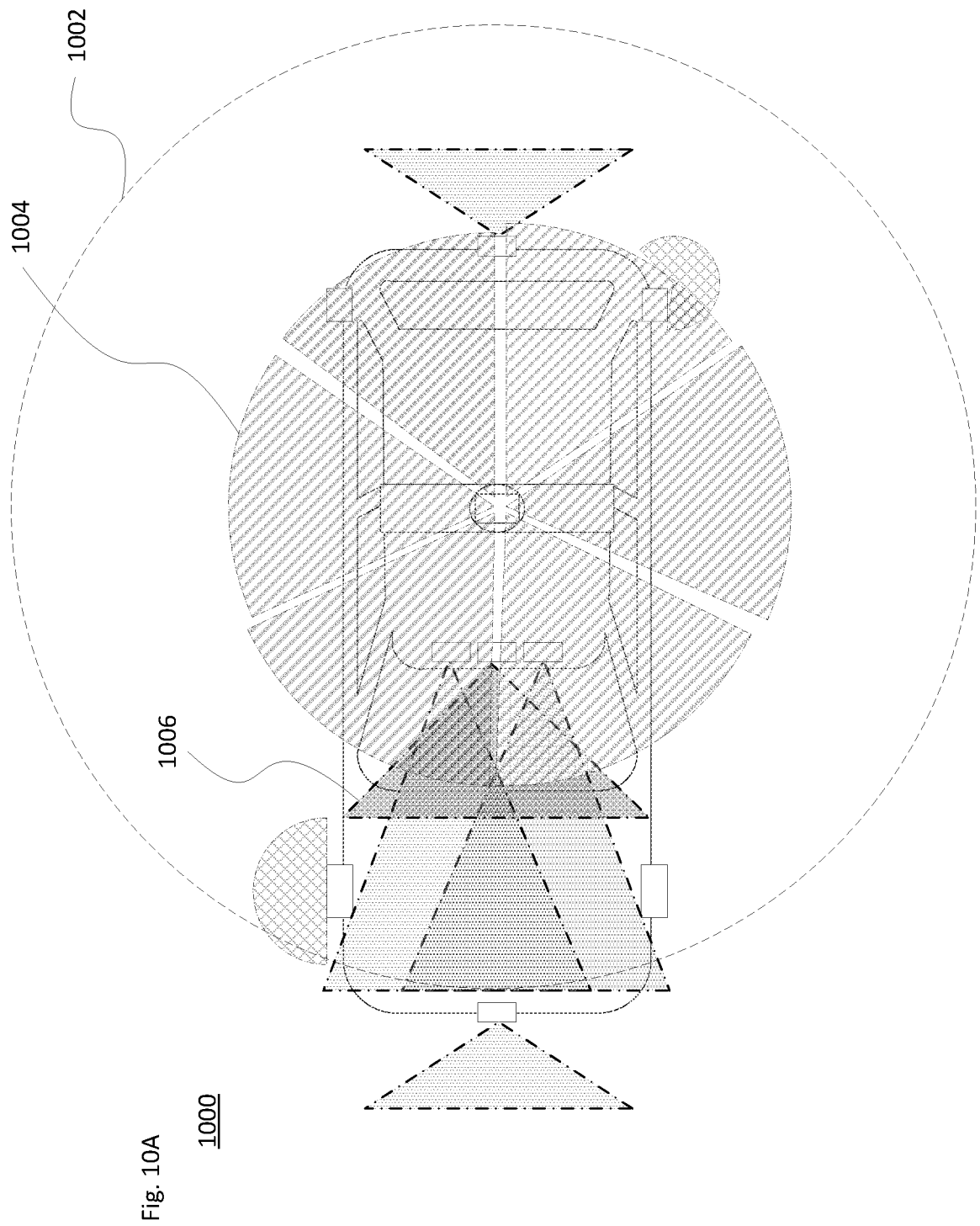
FIGS. 10A-B illustrate examples of operating in different domains in accordance with aspects of the technology.
Figure 10B:
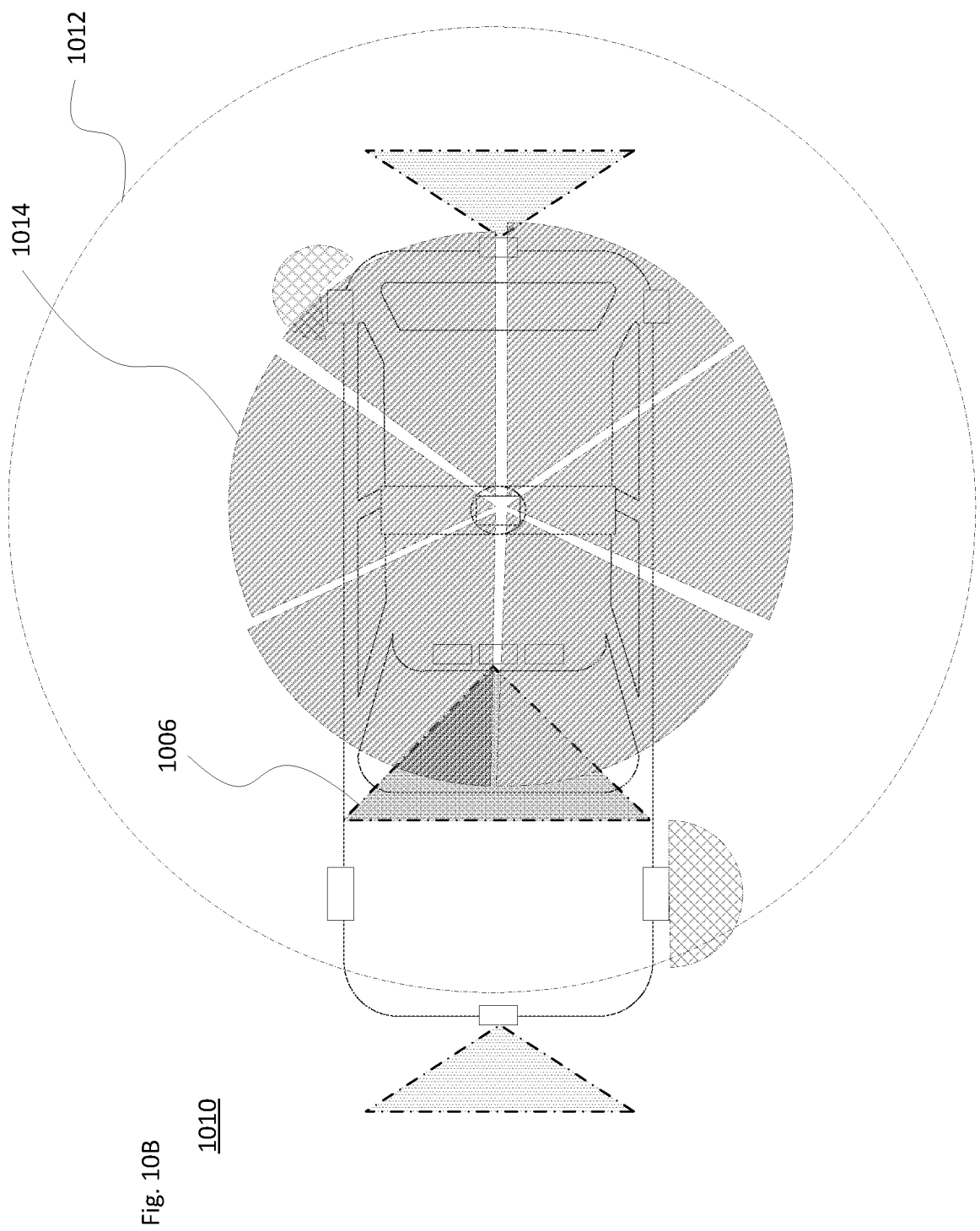

For instance, consider that in one scenario FIG. 6 illustrates a standard operating mode in which the various sensors from both (or all) domains are being used by the vehicle's perception and planning systems. FIG. 10A illustrates one example 1000 of domain A operation. And FIG. 10B illustrates one example 1010 of domain B operation. Here, it can be seen that different sensors or groups of sensors may be used by only one, or by both domains. By way of example, the lidar sensor of FIG. 6 may still provide a 360° FOV for both domains. However, in domain A it may only provide ½ an amount of vertical resolution 1002 that it would during standard operation. Similarly, in domain B the lidar sensor may also only provide ½ an amount of vertical resolution 1012 that it would during standard operation.

And while the cameras within housing 102 (FIG. 2) have individual fields of view 604 that may also provide an overall 360° FOV, each domain may employ different camera sets. Here, for instance, domain A may include the first image sensors 802 (e.g., auto exposure) to provide a first image sensing capability 1004, while domain B may include the second image sensors 804 (e.g., set to a fixed exposure) to provide a second image sensing capability 1014. However, both domain A and domain B may include image sensors 806. This may be the case because image sensors 806 may have a higher resolution than those of image sensors 802 and 804, and face the front of the vehicle. This enhanced resolution may be particularly beneficial for detecting street lights, pedestrians, bicyclists, etc. in front of the vehicle. Thus, as shown in both FIGS. 10A and 10B, each domain may have image sensing capability 1006 from such enhanced resolution image sensors. In other examples, domain B may include image sensing capability 1006 where domain A, which includes other forward image sensing capabilities, does not.

Figure 11A:
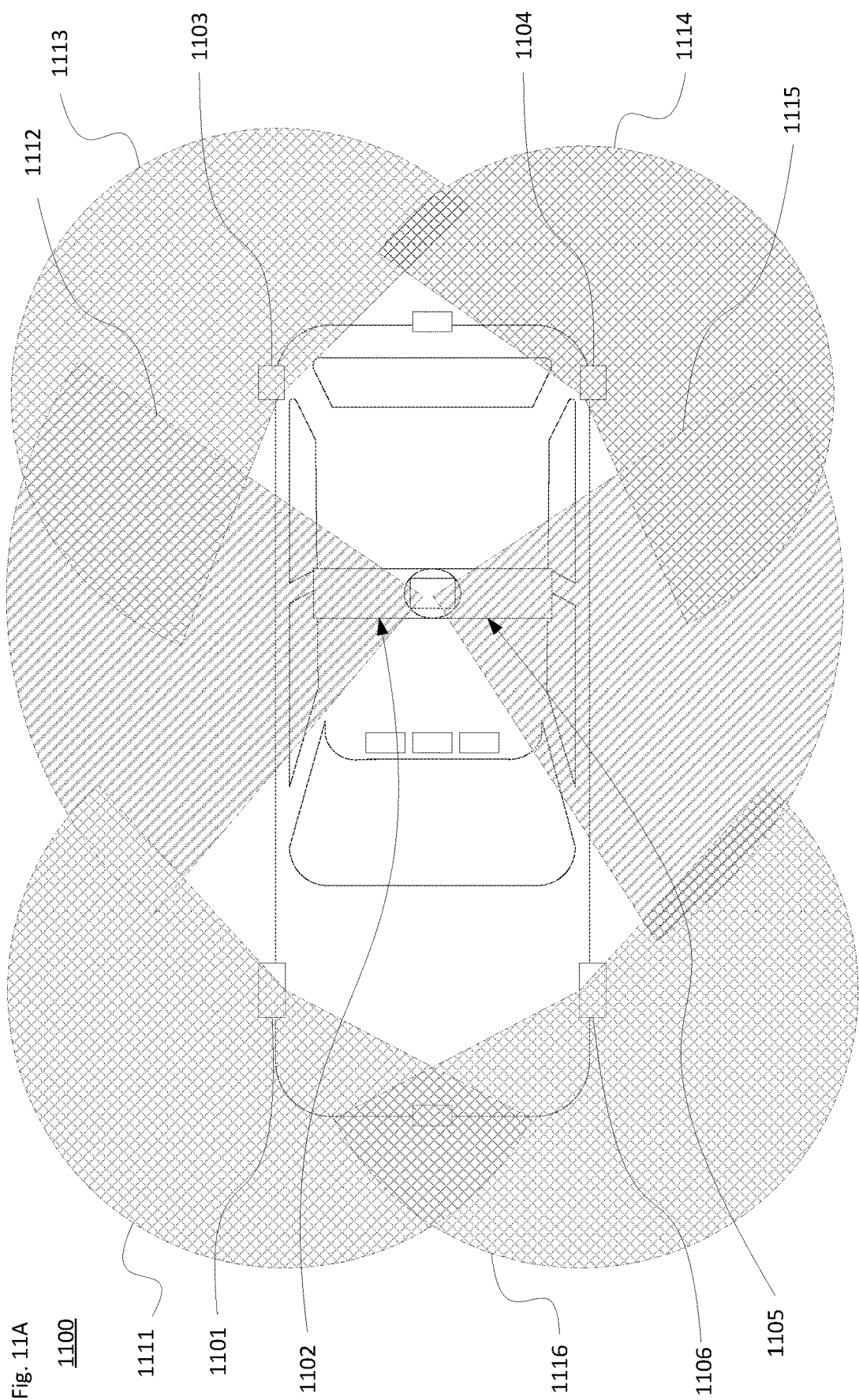
FIGS. 11A-D illustrate further examples of operating in different domains in accordance with aspects of the technology.
Figure 11B:
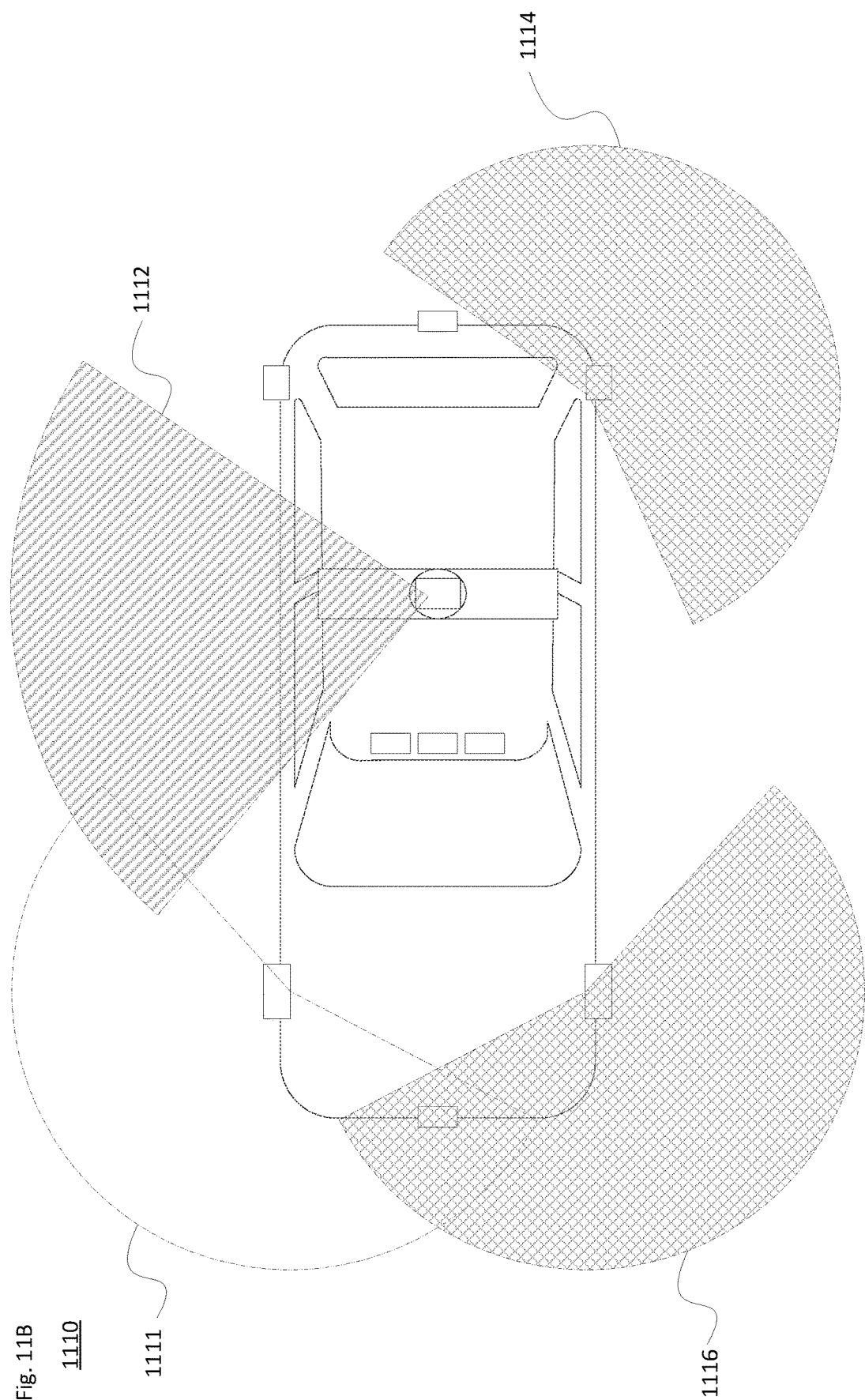
Figure 11C:
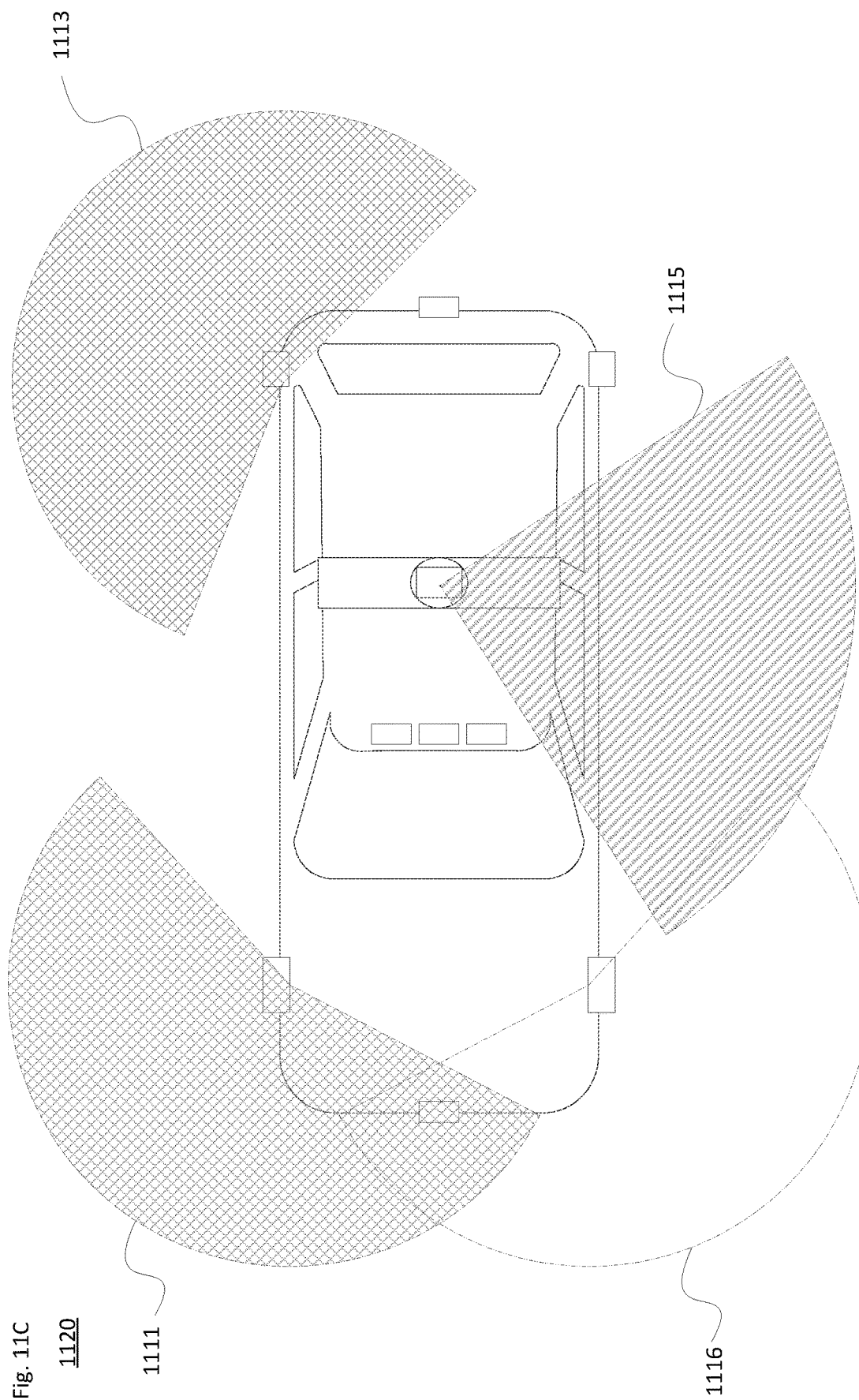

FIGS. 11A-D illustrate how other sensors, such as radar sensors, can be employed in different domains. FIG. 11A shows a combined FOV 1100 for a set of 6 sensors 1101-1106, having respective individual FOVs 1111-1116. The combined FOV 1100 may be available in a standard operating mode. During operation with domain A, as shown in FIG. 11B, only sensors 1101, 1102, 1104 and 1106 are employed, resulting in a domain A FOV configuration 1110. And during operation with domain B, as shown in FIG. 11C, only sensors 1101, 1103, 1105 and 1106 are employed, resulting in a domain B FOV 1120. In these examples for domains A and B, both front-facing sensors are utilized and provide overlapping fields of view.

Figure 11D:
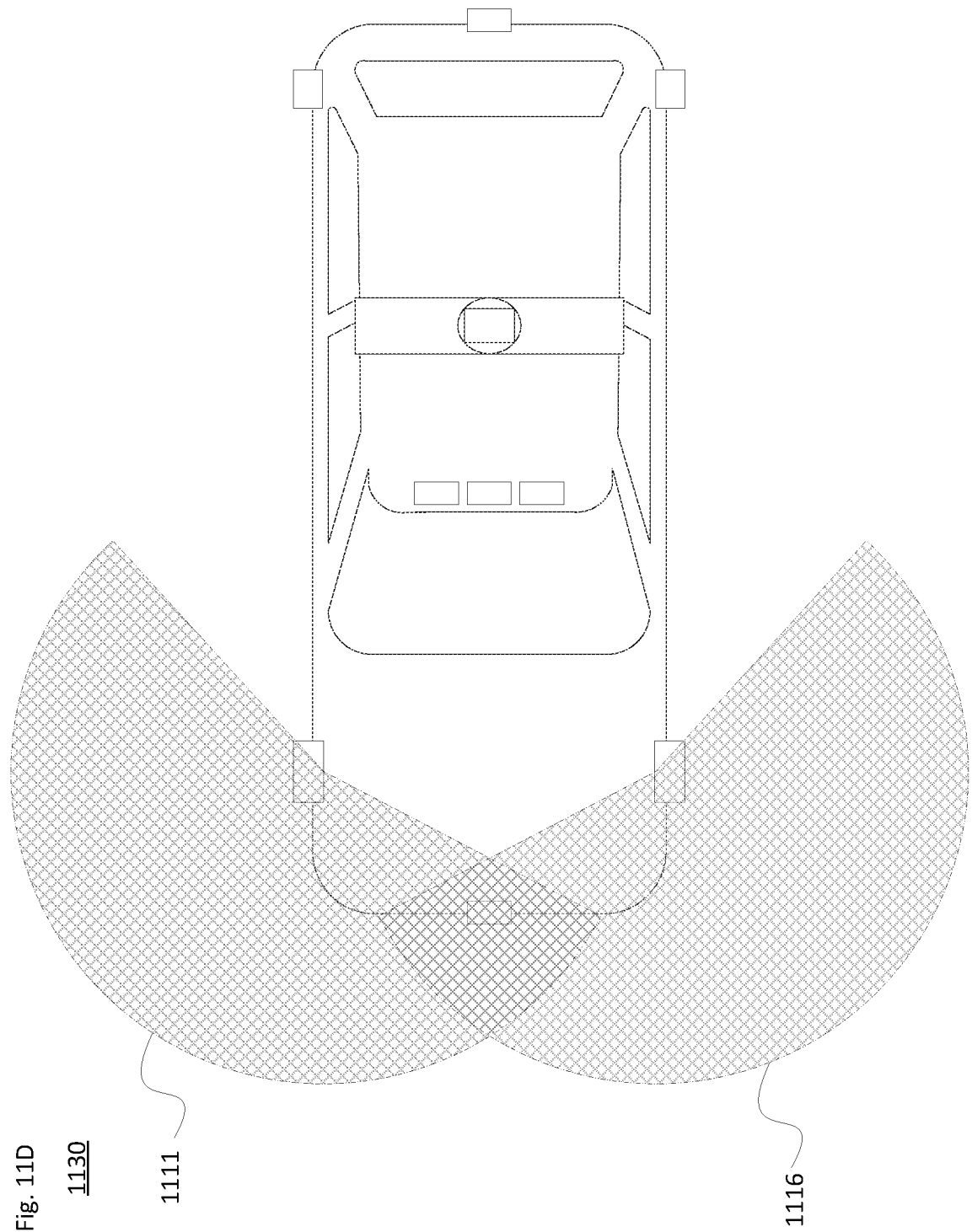

In this scenario, either the domain A or domain B configuration, individually, may provide sufficient sensor data for the vehicle to operate in a first fallback mode. For instance, the vehicle may still be able to drive on the freeway, but in a slower lane or at a minimum posted speed or under another speed threshold. Or, the vehicle may be able to select an alternate route to the destination that has less turns or fewer expected nearby objects (e.g., fewer cars), for instance by taking surface streets as opposed to the freeway. In contrast, FIG. 11D illustrates a different scenario 1120 for a second fallback mode, in which only front-facing sensors 1101 and 1106 are available. In this fallback mode, the system may make significant changes to driving operations because only fields of view 1111 and 1116 are providing sensor input to the vehicle. This may include, for instance, selecting a nearby drop-off point different than the planned destination, turning on the hazard lights with the signaling system, etc.

While the above examples have discussed lidar, cameras and radar sensors for different fallback scenarios, other types of sensors, e.g., positioning, acoustical, infrared, etc., may also be apportioned between the different domains to provide partial redundancy sufficient to control the vehicle in a given operating mode.

Partial Redundancy—Computer System Fallback Modes

Other aspects of the technology include redundancies that are incorporated into the computing system. During typical operation, a first compute system (e.g., a planner subsystem) may generate a trajectory and send it to a second compute system in order to control the vehicle according to that trajectory. Each of these compute systems may be part of the computing devices 302 (FIG. 3). For redundancy, two subsystems may each have one or more processors and associated memory. In this example, each subsystem is powered and operates independently, but shares sensor data and resources to handle basic vehicle operations. Should one of the subsystems fail, e.g., due to a CPU crash, kernel error, power failure, etc., the other subsystem is capable of controlling the vehicle in a designated fallback state of operation.

In one arrangement, both compute subsystems are capable of controlling the vehicle in a standard operating mode as well as a fallback mode. Each subsystem is tied to a respective domain, e.g., via one or more CAN buses or FlexRay buses. However, the sensor suites in each domain do not have to be identical, complementary or fully overlapping. For instance, certain "fallback" sensors may be assigned to control subsystem A (e.g., sensors 1102, 1104 and 1106 of FIG. 11B), other fallback sensors may be assigned to control subsystem B (e.g., sensors 1101, 1103 and 1105 of FIG. 11C), and other "non-fallback" sensors may be assigned only to control subsystem A (see FIG. 12).

Unlike fallback sensors, non-fallback sensors need not be assigned to any particular domain or have any domain independence or redundancy. This is the case because non-fallback sensors are not related to providing a minimum viable fallback capability, but rather may be used for a standard operating mode only. Nonetheless, if there is some other reason (e.g., a vehicle integration) to put such sensors on one domain or the other, that can be accommodated without affecting fallback operation. One example is that one domain has more power supply headroom than another, so the non-fallback sensors can be easily accommodated by that domain. In another example, it may be easier to route wiring on one particular domain, so the non-fallback sensors could be tied to that domain.

FIG. 12 illustrates one example 1200 of a self-driving system configuration. As shown, each domain includes one or more processors 1202a or 1202b, which may be processors 304 from computing system 302. Each domain also include respective operating mode logic 1204a, 1204b, which may comprise software or firmware modules for execution by the processors 1202a, 1202b. The operating mode logic 1204a, 1204b may include separate components for execution in a standard operating mode as well as one or more fallback operating modes. The fallback modes for the different domains may involve operating the vehicle in different ways, for instance according to the types and capabilities of the fallback sensors associated with the respective domains. And as shown in FIG. 12, one of the domains (e.g., domain A) may include different compute resources, such as one or more graphical processing units (GPUs) 1206 or other computational accelerator (e.g., an ASIC, FPGA, etc.). Here, one set of fallback sensors are associated with domain A, another set of fallback sensors is associated with domain B, and one or more non-fallback sensors are also associated with domain A, although other configurations are possible, for instance with the fallback sensors being assigned to domain B, or in which one subset is assigned to domain A and another subset is assigned to domain B. The two (or more) compute domains do not need to have the same performance, or the same kinds of compute elements, although in certain configurations they may have equivalent performance and/or the same kinds of compute elements.

By way of example only, in this configuration domain A may support the perception system (e.g., perception system 324 of FIGS. 3-4) during standard operation, while domain B may support the planner (e.g., route planning based on the navigation system 320 and the positioning system 322 of FIG. 3) during standard operation. The GPU(s) 1206 may be configured to process sensor data received from some or all of the on-board sensors during standard operation.

In one scenario, each computing subsystem may have enough sensor input and enough computing capability (e.g., processor and memory resources to process the received sensor data) to operate the vehicle in the corresponding standard and fallback operating modes. The two (or more) domains may share information in the standard mode. This way, the various domains and subsystems can be used to provide optical FOV coverage. According to aspects of the technology, some compute resources may be held in reserve to handle fallback operation. And some typical operations in the standard mode may be stopped in case of fallback. For example, one or more forward-facing high resolution cameras (e.g., cameras 806 of FIG. 8) may be considered non-fallback-critical sensors. As a result, if a fallback mode is entered, processing inputs from these cameras may be halted.

Partial Redundancy—Power Distribution Fallback Modes

Figure 13A:
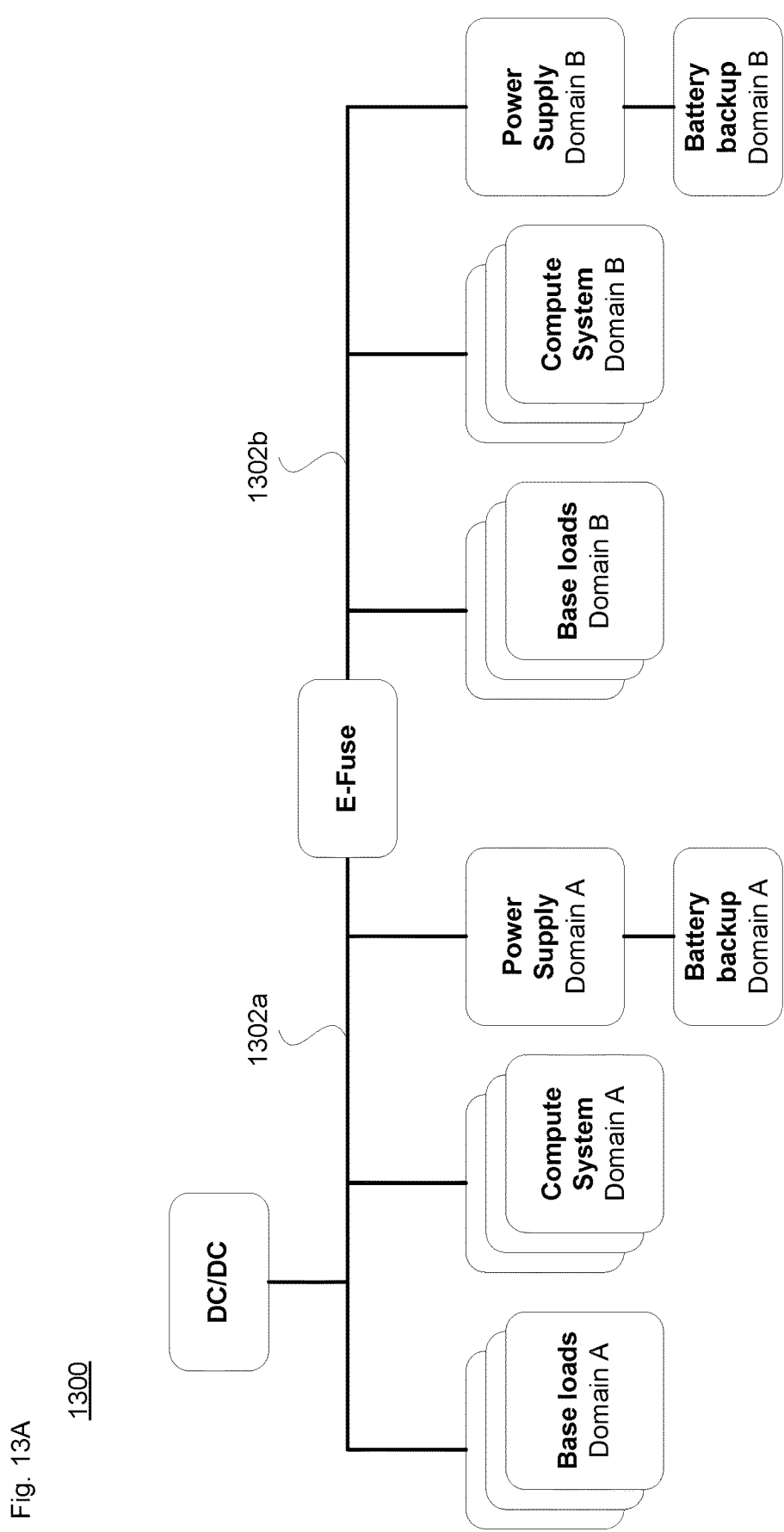

With regard to power distribution, aspects of the technology provide two fault independent power supplies, each having a battery backup. By way of example, the dual power supplies are operationally isolated so that major faults are limited to only one domain. Each power supply may service a particular set of base vehicle loads. FIG. 13A illustrates an example redundant power distribution architecture 1300. As shown in this scenario, each domain has its own independent power supply. Here, the power supplies and loads of each domain are protected by an intervening electronic fuse. In practice, during normal operation the e-fuse would be a closed circuit. Should it detect a failure in the form of an over current, under voltage or over temperature (or other aberrant condition), it would quickly react to become an open-circuit, thereby isolating the two domains.

Each power supply has a battery backup, and is configured to provide an automotive standard on the order of 12 volts (e.g., within the range of 8-16 volts). Each domain has a separate power distribution block 1302a, 1302b, such as power distribution elements 327 of FIG. 3.

The DC/DC unit is a voltage converter that that takes power from the high voltage battery pack upstream and converts it into low voltage (e.g., 12V) to charge 12V batteries. In the e-fused architecture, due to the presence of the e-fuse, the DC/DC unit can charge both halves of the system when everything is working (non-faulted), so 2 DC/DC units are not required. When a fault occurs, the system does not necessarily need to use the DC/DC unit because power can be supplied by the redundant low voltage backup batteries on each domain.

Another example of power redundancy that does not require an e-fuse would be a dual independent DC/DC system 1310 as shown in FIG. 13B. Here, each domain is served by its own DC power supply. In this example, each domain has a separate power distribution block 1312a, 1312b. Grounding of the system is provided so that return current paths for the domains do not present single points of failure.

There may be fallback critical actuators, such as brakes, steering and/or propulsion. And there may be non-fallback critical actuators, such as the horn, cabin lights, heating and air conditioning system, etc. Actuators that are considered fallback critical may be redundant (e.g., 2 or more separate actuators), and/or such actuators may receive power from both domains. In contrast, non-fallback critical actuators may have no redundant components and/or may only receive power from a single domain.

There may also be redundancies in other subsystems of the vehicle. For instance, the braking and steering subsystems may be made redundant (in addition to being powered redundantly). Likewise, communication with other vehicles or remote assistance may employ multiple cellular or other types of communication links. Two or more GPS receives may be used. Even wipers, sprayers or other cleaning components may configured for redundancy, and may be powered (as a base load) on one or both (or more) of the domains. Base vehicle loads may include individual sensors, sensor suites, compute devices, actuators and/or other components, such as those discussed with regard to FIG. 3.

Figure 14:
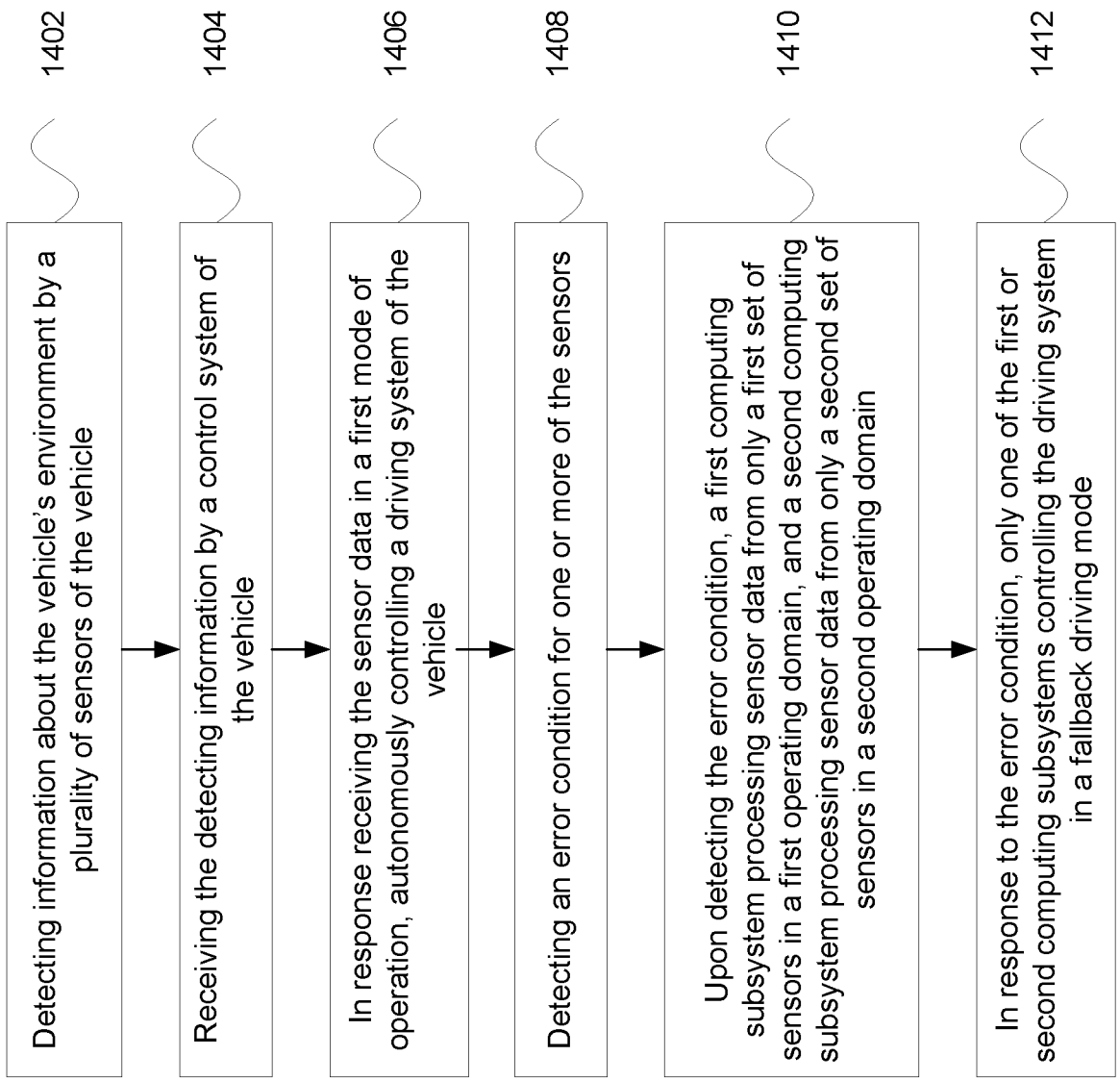
FIG. 14 is a method of operation according to aspects of the technology.

FIG. 14 illustrates a method 1400 of operating a vehicle in accordance with aspects of the technology. As shown in block 1402, information about the vehicle's environment is detected by the vehicle's sensors (e.g., lidar, radar, camera, auditory and/or positioning sensors). At block 1404, the detected information is received by a control system of the vehicle, such as computing system(s) 302 of FIG. 3 or system 1200 of FIG. 12. Per block 1406, in response to receiving the sensor data in a first mode of operation, a driving system of the vehicle is autonomously controlled. At block 1408, an error condition of one or more of the vehicle's sensors is detected. This may be due, e.g., to a failure, fault or other reduction in sensor capability.

At block 1410, upon detecting the error condition, a first computing subsystem processes sensor data from a first set of sensors in a first operating domain, and a second computing subsystem processes sensor data from a second set of sensors in a second operating domain. As a result, at block 1412, in response to the error condition one of the first or second computing subsystems controls the driving system of the vehicle in a fallback driving mode. In some examples, prior to detecting the error condition, the first computing subsystem may be operating a function (e.g., planner, perception, etc.) in a standard operating mode, and the second computing subsystem may be operating another function in the standard operating mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A vehicle configured to operate in an autonomous driving mode, the vehicle comprising:
 a driving system including a steering subsystem, an acceleration subsystem and a deceleration subsystem to control driving of the vehicle in the autonomous driving mode;
 a perception system having a plurality of sensors configured to detect information about an environment around the vehicle, the plurality of sensors including a first set of sensors associated with a first operating domain and a second set of sensors associated with a second operating domain; and
 a control system operatively coupled to the driving system and the perception system, the control system including a first computing subsystem associated with the first operating domain and a second computing subsystem associated with the second operating domain, each of the first and second computing subsystems having one or more processors, wherein:
  the first and second computing subsystems are each configured to receive sensor data from both of the first set of sensors and the second set of sensors in a first mode of operation, and in response to the received sensor data in the first mode of operation, the control system is configured to control the driving system to drive the vehicle in the autonomous driving mode;
  upon detecting an error condition for one or more of the plurality of sensors, the first computing subsystem is configured to process sensor data received from only the first set of sensors in the first operating domain and the second computing subsystem is configured to process sensor data received from only the second set of sensors in the second operating domain; and
  in response to detecting the error condition, only one of the first computing subsystem or the second computing subsystem is configured to control the driving system in a fallback driving mode.

2. The vehicle of claim 1, wherein each of the first set of sensors and the second set of sensors include at least one sensor selected from the group consisting of lidar sensors, radar sensors, camera sensors, auditory sensors and positioning sensors.

3. The vehicle of claim 2, wherein each of the first and second sets of sensors includes a respective group of lidar, radar and camera sensors, each group providing a selected field of view of the environment around the vehicle.

4. The vehicle of claim 1, wherein each of the sensors in the first set of sensors has a respective field of view, each of the sensors in the second set of sensors has a respective field of view, and the respective fields of view of the second set of sensors are different from the respective fields of view of the first set of sensors.

5. The vehicle of claim 1, further comprising one or more interior sensors disposed in an interior of the vehicle, the one or more interior sensors including at least one of a camera sensor, an auditory sensor and an infrared sensor.

6. The vehicle of claim 1, wherein:
 the fallback driving mode includes a first fallback mode and a second fallback mode, the first fallback mode including a first set of driving operations and the second fallback mode including a second set of driving operations different from the first set of driving operations;
 the first computing subsystem is configured to control the driving system in the first fallback mode; and
 the second computing subsystem is configured to control the driving system in the second fallback mode.

7. The vehicle of claim 1, further comprising a first power distribution subsystem and a second power distribution subsystem, wherein:
 in the fallback driving mode the first power distribution subsystem is associated with the first operating domain to power only devices of the first operating domain, in the fallback driving mode the second power distribution subsystem is associated with the second operating domain to power only devices of the second operating domain, and the first and second operating domains are electrically isolated from one another.

8. The vehicle of claim 7, wherein:

the first power distribution subsystem is configured to provide power to a first set of base vehicle loads in the first mode of operation and to provide power to devices of the first operating domain in the fallback driving mode; and the second power distribution subsystem is configured to provide power to a second set of base vehicle loads different than the first set of base vehicle loads in the first mode of operation and to provide power to devices of the second operating domain in the fallback driving mode.

9. The vehicle of claim 1, wherein the plurality of sensors of the perception system include:

a first set of fallback sensors operatively coupled to the first computing subsystem;

a second set of fallback sensors operatively coupled to the second computing subsystem; and a set of non-fallback sensors.

10. The vehicle of claim 9, wherein the set of non-fallback sensors are operatively coupled to one or both of the first computing subsystem and the second computing subsystem.

11. The vehicle of claim 1, wherein the plurality of sensors of the perception system include a subset of sensors operatively coupled to both the first and second computing subsystems in the fallback driving mode.

12. A method of operating a vehicle in an autonomous driving mode, the method comprising:

detecting, by a plurality of sensors of a perception system of the vehicle, information about an environment around the vehicle, the plurality of sensors including a first set of sensors associated with a first operating domain and a second set of sensors associated with a second operating domain;

receiving, by a control system of the vehicle, the detected information about the environment around the vehicle as sensor data from both the first set of sensors and the second set of sensors in a first mode of operation, the control system including a first computing subsystem associated with the first operating domain and a second computing subsystem associated with the second operating domain;

in response to receiving the sensor data in the first mode of operation, the control system controlling a driving system of the vehicle to drive the vehicle in the autonomous driving mode;

detecting an error condition for one or more of the plurality of sensors;

upon detecting the error condition, the first computing subsystem processing sensor data received from only the first set of sensors in the first operating domain and the second computing subsystem processing sensor data received from only the second set of sensors in the second operating domain; and in response to detecting the error condition, only one of the first computing subsystem or the second computing subsystem controlling the driving system in a fallback driving mode.

13. The method of claim 12, wherein the fallback driving mode comprises a plurality of fallback modes including a first fallback mode and a second fallback mode.

14. The method of claim 13, wherein the first fallback mode includes a first set of driving operations and the second fallback mode including a second set of driving operations different from the first set of driving operations.

15. The method of claim 14, wherein controlling the driving system in the fallback driving mode includes:

the first computing subsystem controlling the driving system in the first fallback mode; or the second computing subsystem controlling the driving system in the second fallback mode.

16. The method of claim 12, further comprising in the fallback driving mode:

powering, by a first power distribution subsystem of the vehicle, only devices of the first operating domain; and powering, by a second power distribution subsystem of the vehicle, only devices of the second operating domain.

17. The method of claim 16, wherein:

the first power distribution subsystem provides power to a first set of base vehicle loads in the first mode of operation and provides power to devices of the first operating domain in the fallback driving mode; and the second power distribution subsystem provides power to a second set of base vehicle loads different than the first set of base vehicle loads in the first mode of operation and provides power to devices of the second operating domain in the fallback driving mode.

18. The method of claim 12, wherein, during the fallback driving mode a subset of the plurality of sensors of the perception system provides sensor data to both the first and second computing subsystems.

19. The method of claim 12, wherein controlling the driving system in the fallback driving mode includes at least one of altering a previously planned trajectory of the vehicle, altering a speed of the vehicle, or altering a destination of the vehicle.

20. The method of claim 12, further comprising halting processing of sensor data from a non-fallback-critical sensor during the fallback driving mode.

* * * * *